(12) United States Patent
Nakajima et al.

(10) Patent No.: US 9,960,697 B2
(45) Date of Patent: May 1, 2018

(54) INSULATION TYPE STEP-DOWN CONVERTER

(71) Applicant: Mitsubishi Electric Corporation, Chiyoda-ku, Tokyo (JP)

(72) Inventors: Koji Nakajima, Tokyo (JP); Takashi Kumagai, Tokyo (JP); Yuji Shirakata, Tokyo (JP); Yujiro Kido, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/517,619

(22) PCT Filed: Nov. 6, 2015

(86) PCT No.: PCT/JP2015/081312
§ 371 (c)(1),
(2) Date: Apr. 7, 2017

(87) PCT Pub. No.: WO2016/076222
PCT Pub. Date: May 19, 2016

(65) Prior Publication Data
US 2017/0310228 A1    Oct. 26, 2017

(30) Foreign Application Priority Data

Nov. 10, 2014 (JP) ................ 2014-227932

(51) Int. Cl.
*H02M 3/335* (2006.01)
*H02M 7/00* (2006.01)
(Continued)

(52) U.S. Cl.
CPC ........ *H02M 3/33569* (2013.01); *H01F 27/24* (2013.01); *H01F 27/2804* (2013.01); *H01F 27/2876* (2013.01); *H02M 7/003* (2013.01)

(58) Field of Classification Search
None
See application file for complete search history.

(56) References Cited

U.S. PATENT DOCUMENTS

2008/0212341 A1* 9/2008 Moiseev ............ H01F 3/14
363/21.04
2008/0239759 A1  10/2008 Nakahori
(Continued)

FOREIGN PATENT DOCUMENTS

JP  2004-303857 A  10/2004
JP  2008-178205 A  7/2008
(Continued)

OTHER PUBLICATIONS

International Search Report (PCT/ISA/210) dated Jan. 26, 2016, by the Japanese Office as the International Searching Authority for International Application No. PCT/JP2015/081312.
(Continued)

*Primary Examiner* — Jeffrey Gblende
(74) *Attorney, Agent, or Firm* — Buchanan Ingersoll & Rooney PC

(57) ABSTRACT

An insulation type step-down converter includes first, second, third, and fourth secondary-side coils, and first, second, third, and fourth rectifier elements. The first, second, third, and fourth rectifier elements is capable of performing rectification such that electric currents flow alternately only in one of the first and second secondary-side coils and one of the third and fourth secondary-side coils, and electric currents flowing simultaneously in one of the first and second secondary-side coils and one of the third and fourth secondary-side coils are opposite in direction to each other so as to cancel out a magnetic flux passing through the middle leg each time when electric current flowing in the primary-side coil is changed in direction. Provided is an insulation type step-down converter which can minimize an increase in heat (Continued)

generated by the primary-side coil even at a large step-down ratio of a step-down transformer without raising manufacturing costs.

8 Claims, 16 Drawing Sheets

(51) Int. Cl.
    *H01F 27/28*    (2006.01)
    *H01F 27/24*    (2006.01)

(56) References Cited

U.S. PATENT DOCUMENTS

2009/0195173 A1\* 8/2009 Morimoto ............... H01F 38/10
    315/277
2010/0321960 A1\* 12/2010 Nakahori ............ H01F 27/2804
    363/21.04

FOREIGN PATENT DOCUMENTS

| JP | 2008-253113 A | 10/2008 |
| JP | 2011-77328 A | 4/2011 |
| JP | 2013-198387 A | 9/2013 |

OTHER PUBLICATIONS

Written Opinion (PCT/ISA/237) dated Jan. 26, 2016, by the Japanese Office as the International Searching Authority for International Application No. PCT/JP2015/081312.

\* cited by examiner

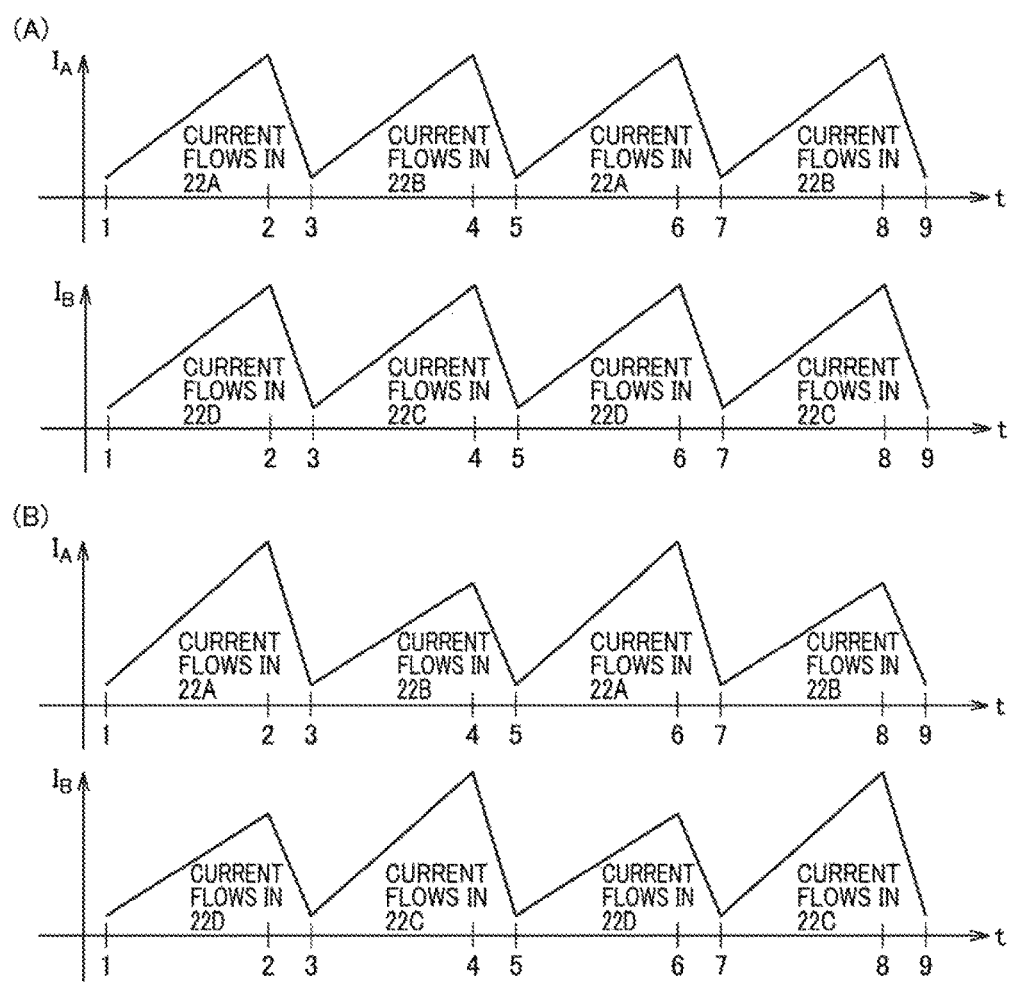

INSULATION TYPE STEP-DOWN CONVERTER

TECHNICAL FIELD

The present invention relates to an insulation type step-down converter, and more particularly to an insulation type step-down converter which produces a DC constant voltage from a DC high voltage.

BACKGROUND ART

Japanese Patent Laying-Open No. 2004-303857 (PTD 1), for example, discloses, as, a step-down transformer included in a DC-DC (direct current-direct current) converter which is a type of switching power supply, a structure in which several spiral, turns of a primary-side coil and a turn of a secondary-side coil are stacked. Japanese Patent Laying-Open No. 2011-77328 (PTD 2), for example, discloses a structure in which secondary-side coils obtained by coupling two coils in series, each being wound a turn, into the S shape are arranged to hold a primary-side coil therebetween from above and below.

CITATION LIST

Patent Document

PTD 1: Japanese Patent Laying-Open No. 2004-303857
PTD 2: Japanese Patent Laying-Open No, 2011-77328

SUMMARY OF INVENTION

Technical Problem

An insulation type step-down converter which is a type of a DC-DC converter is requested to have a large step-down ratio which is a ratio of a high voltage of the primary-side coil of a step-down transformer to a low voltage of a secondary-side coil. To set a large step-down ratio in the step-down transformer disclosed in each of Japanese Patent Laying-Open Nos. 2004-303857 and 2011-77328, it is necessary to increase the number of turns of the primary-side coil.

However, if the number of turns is increased while hardly increasing the entire size of the primary-side coil, the current-carrying cross section of the winding of the primary-side coil will decrease, so that heat generated by the primary-side coil will increase. Although heat generation can be minimized by using a thick pattern formed on a printed circuit board or a resin-sealed thick copper plate as the primary-side coil, cost increase is incurred.

The present invention was made in view of the above-described problem, and has an object to provide an insulation type step-down converter which can an increase in heat generated by a primary-side coil without raising manufacturing costs even at a large step-down ratio of a step-down transformer.

Solution to Problem

An insulation type it converter of the present invention includes a core, a primary-side coil, first, second, third, and fourth secondary-side coils, and first, second, third, and fourth rectifier elements. The core includes a middle leg, a first outer leg and a second outer leg. The first, second, third, and fourth rectifier elements are capable of performing rectification such that electric current flows alternately only in one of the first and second secondary-side coils as well as one of the third and fourth secondary-side coils, and electric currents flowing simultaneously in one of the first and second secondary-side coils as well as one of the third and fourth secondary-side coils are opposite in direction to each other so as to cancel out a magnetic flux passing through the middle leg each time when electric current flowing in the primary-side coil is changed in direction.

Advantageous Effects of Invention

According to the present invention, since the number of turns of the primary-side coil can be reduced, an increase in heat generated by the primary-side coil can be minimized without raising manufacturing costs.

BRIEF DESCRIPTION OF DRAWINGS

FIG. 19 shows a graph showing time changes in electric current flowing in a smoothing coil 42A in a coupling balanced state in the third embodiment, a graph (A) showing time changes in electric current flowing in to smoothing coil 42B in the coupling balanced state in the third embodiment, a graph showing time changes in electric current flowing in smoothing coil 42A in the coupling unbalanced state in the third embodiment, and a graph (B) showing time changes in electric current flowing in smoothing coil 42B in the coupling unbalanced state in the third embodiment.

DESCRIPTION OF EMBODIMENTS

Hereinafter, embodiments of the present invention will be described based on the drawings.

First Embodiment

First, a circuit constituting an insulation type step-down converter of the present embodiment will be described using FIG. 1.

Figure 1:
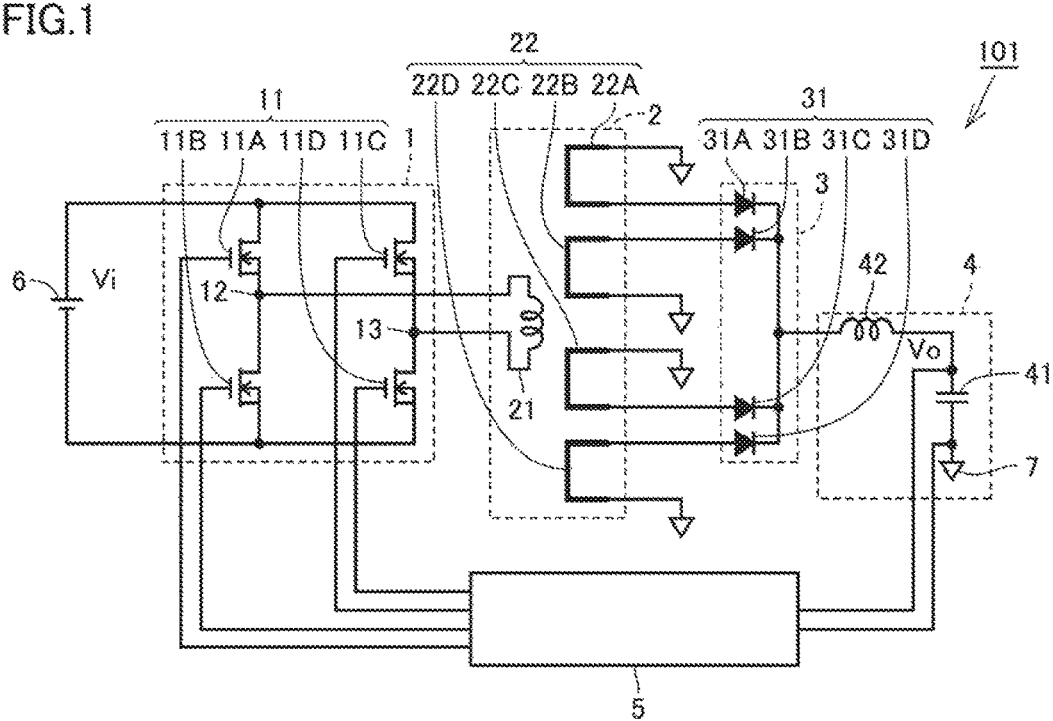
FIG. 1 is a circuit block diagram showing a first example of art insulation type step-down converter of a first embodiment.

Referring to FIG. 1, an insulation type step-down converter 101 of a first example of the present embodiment mainly has a primary-side drive circuit 1, a step-down transformer 2, a rectifier circuit 3, a smoothing circuit 4, and control circuit 5.

Primary-side drive circuit 1 has four switching elements 11A, 11B, 11C, and 11D (which will be collectively called a switching element 11). Step-down transformer 2 has a primary-side coil 21 and four secondary-side coils 22A, 22B, 22C, and 22D (which will be collectively called a secondary-side coil 22). Rectifier circuit 3 has four rectifier elements 31A, 31B, 31C, and 31D (which will be collectively called a rectifier element 31). Smoothing circuit 4 has a smoothing capacitor 41 and a smoothing coil 42.

In primary side drive circuit 1, witching element 11 is connected as shown in FIG. 1. Specifically, switching elements 11A and 11B connected in series and switching elements 11C and 11D connected in series are connected in parallel. A node 12 exists between switching elements 11A and 11B, and a node 13 exists between switching elements 11C and 11D. Primary side, coil 21 is connected across nodes 12 and 13.

Since switching element 1 is connected to control circuit 5, switching elements 11A to 11D are, controlled by control circuit 5 so as to be alternately turned on and off. Specifically, a first state in which switching elements 11A and 11D are turned on and a second state in which switching elements 11B and 11C are turned on are brought about alternately at regular time intervals. Accordingly, in primary-side drive circuit 1, an input voltage from a voltage Vi of a DC power supply 6 is applied to primary-side coil 21 in opposite directions to each other in the first and, second states (so as to be a positive voltage in one state and a negative voltage in the other state).

As described above, switching element 11 constitutes a so-called full bridge circuit by four switching elements 11A to 11D. However, the mode of switching element 11 is not limited to that shown in FIG. 1 as long, as a voltage can be applied alternately to primary-side coil 21 in opposite directions to each other in the first and second states, and a so-called half bridge circuit implemented by two switching elements, for example, may be adopted.

One of a pair of ends of secondary-side coil 22A is connected to a reference potential 7 on the secondary side of insulation type step-down converter 101, and the other end is connected to the anode of rectifier element 31A. Similarly, one of a pair of ends of each of secondary-side coils 22B, 22C and 22D is connected to reference potential 7 on the secondary side of insulation type step-down converter 101, and the other end is connected to the anode of a corresponding one of rectifier elements 31B, 31C and 31D.

The cathode of each of rectifier elements 31A to 31 is connected to smoothing coil 42, and smoothing coil 42 and smoothing capacitor 41 are connected in series, thereby constituting smoothing circuit 4.

Next, the structure of each component constituting step-down transformer 2 in the present embodiment will be described using FIGS. 2 to 5.

Figure 2:
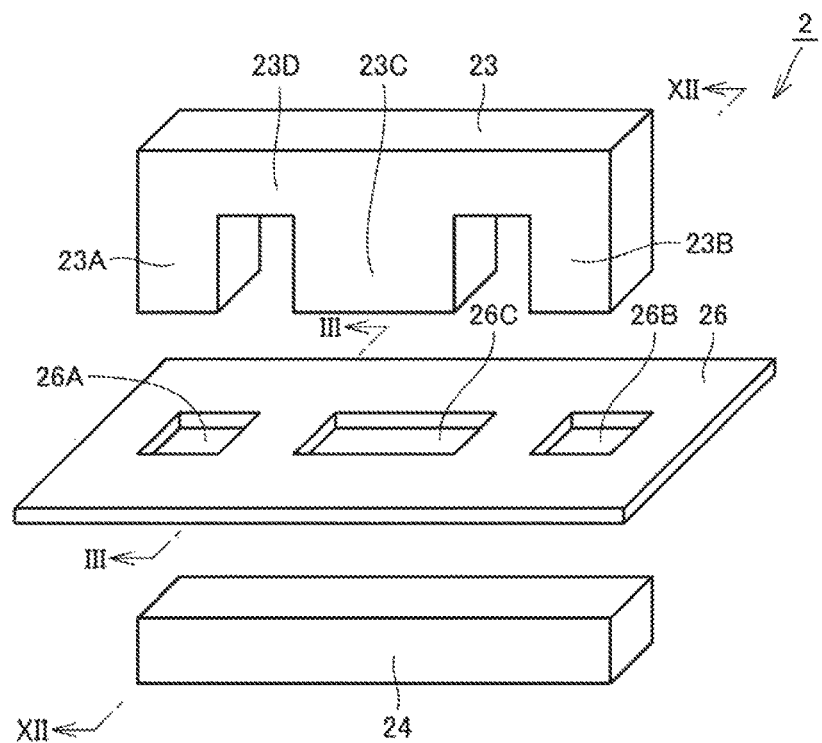
FIG. 2 is an exploded perspective view showing arrangement of cores and a multilayer printed board constituting a step-down transformer of the first embodiment.

Referring to FIG. 2, step-down transformer 2 of the present embodiment mainly has an E-shaped core 23 (core), an I-shaped core 24 and a multilayer printed board 26. E-shaped core 23 has outer legs 23A and 23B, a middle leg 23C and a core coupling part 23D shown FIG. 2. It is noted that since FIG. 2 is an exploded perspective view merely showing arrangement of the above-described respective components, not a mode in which these respective components have been assembled in step-down transformer 2 finally.

Outer leg 23A (first outer leg) extends in the same direction as middle leg 23C, that is, downward in FIG. 2, and is spaced from middle leg 23C (in the horizontal direction in FIG. 2). Outer leg 23B (second outer leg) is spaced from middle leg 23C (in the horizontal direction in FIG. 2) opposite to outer FIG. 23A with respect to middle leg 23C (i.e., on the right side of middle leg 23C in FIG. 2). That is, two outer legs 23A and 23B are arranged to sandwich middle leg 23C from the right and left sides in FIG. 2. Core coupling part 23D is a portion extending in the direction (horizontal direction in FIG. 2) crossing the direction in which outer legs 23A, 23B and middle leg 23C extend such that outer legs 23A, 23B and middle leg 23C extending in the vertical direction in FIG. 2 are connected to each other at their upper ends.

In FIG. 2, the cross section crossing the direction in which middle leg 23C extends is larger than the cross section crossing the direction in which outer legs 23A and 23B extend. More specifically, the cross sections of outer legs 23A and 23B in FIG. 2 are almost equal in area, and the sum of the areas of the cross sections of two outer legs 23A and 23B is almost equal to the area of the cross section of middle leg 23C. However, this mode is not a limitation.

E-shaped core 23 has a shape just like the character of "E" when seen from the front side in FIG. 2.

I-shaped core 24 has a rectangular parallelepiped shape extending in the horizontal direction in the drawing similarly to core coupling part 23D. Preferably, E-shaped core 23 and I-shaped core 24 each have a rectangular shape (long shape) in a congruence relationship with each other when FIG. 2 as a whole is seen from above (seen in plan view).

It is noted that both E-shaped core 23 and I-shaped core 24 are preferably made of generally-known ferrite or the like.

Multilayer printed board 26 is a flat plate-like component having a rectangular shape in plan view, for example. Multilayer printed board 26 has three through-holes 26A, 26B and 26C, for example, spaced from each other and formed in line in a manner to extend through multilayer printed board 26 from one main surface (the upper side in the drawing) to the other main surface (the lower side in the drawing).

Multilayer printed board 26 arranged to be sandwiched between E-shaped core 23 and I-shaped core 24 is set such that outer leg 23A is inserted through through-hole 26A, outer leg 23B is inserted through through-hole 26B and middle FIG. 23C is inserted through through-hole 26C, and outer and middle legs 23A. 23B and 23C are fixed such that their terminal ends (on the lowermost part in FIG. 2) are mounted on the surface of the long shape of I-shaped core 24. Step-down transformer 2 is thereby assembled such that outer legs 23A, 23B and part of middle leg 23C of E-shaped core 23 are inserted through through-holes 26A, 26B and 26C, respectively. As will be described later, assembled step-down transformer 2 has two magnetic paths, one formed by outer leg 23A and middle leg 23C, the other formed by outer leg 23B and middle leg 23C.

It is noted that two magnetic paths are formed here by combining E-shaped core 23 and I-shaped core 24, but this is not a limitation. A step-down transformer having two magnetic paths may be assembled by combining two E-shaped cores or combining two EER type cores, for example.

Figure 3:
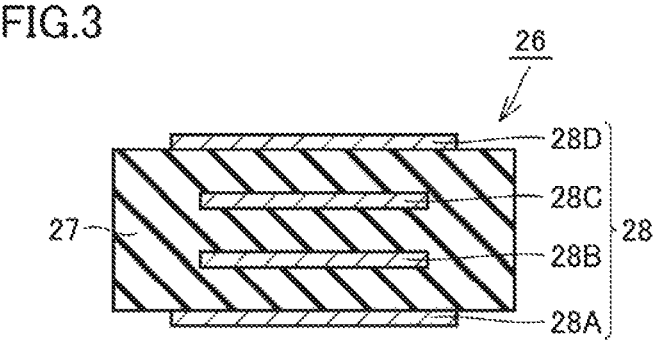
FIG. 3 is a schematic sectional view showing a structure of the multilayer printed board at a portion taken along the line III-III of FIG. 2.

Referring to FIGS. 2 and 3, multilayer printed board 26 is a substrate formed by using a substrate, body 27 of an insulating material, such as generally-known resin, for example, as a base and a pattern 28 of a plurality of metallic thin films of copper or the like, for example, formed therein as traces. Multilayer printed board 26 of the present embodiment has a four-layer pattern of patterns 28A, 28B, 28C, and 28D, for example. Among them, pattern 28A of the lowermost layer may be formed so as to come into contact with the lowermost surface of substrate body 27 (i.e., so as to be the lowermost layer of multilayer printed board 26 as a whole). Pattern 28D of the uppermost layer may be formed so as to come into contact with the uppermost surface of substrate body 27 (i.e., so as to be the uppermost layer of multilayer printed board 26 as a whole). However, this mode is not a limitation, but patterns 28A and 28D, for example, may be formed within multilayer printed board 26 (similarly to patterns 28B and 28C). Patterns 28A to 28D are in the mode in which they are spaced from each other in the vertical direction in FIG. 3 by substrate body 27 made of an insulating material and are not electrically connected (not short-circuited) to each other unless they are connected by wiring, vias or the like, for example.

Multilayer printed board 26 having four-layer patterns 28A to 28D as shown in FIG. 3 may also be called a four-layer printed circuit board.

Figure 4:
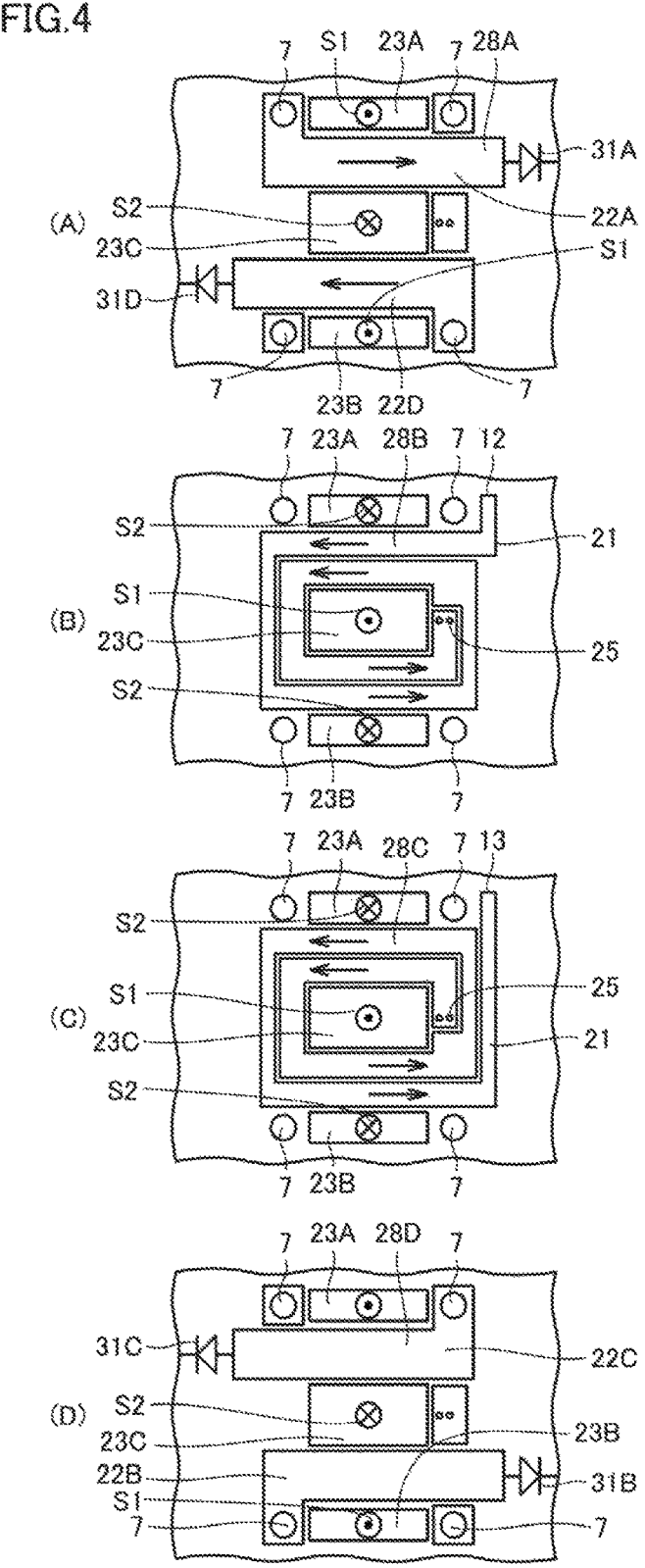
FIG. 4 shows a schematic plan view (A) showing a mode of coils and as first state of the coils in a first layer of a metallic thin film pattern m the multilayer printed board of FIG. 3 in a first example of the first embodiment, a schematic plan view (B) showing a mode of coils and the first state of the coils in a second layer of the metallic thin film pattern in the multilayer printed hoard of FIG. 3 in the first example of the first embodiment, a schematic plan view (C) showing a mode of coils and the first state of the coils in a third layer of the metallic thin film pattern in the multilayer printed board of FIG. 3 in the first example of the first embodiment, and a schematic plan view (F)) showing a mode of cods and the first state of the coils in a fourth layer of the metallic thin film pattern in the multi layer printed board of FIG. 3 in the first example of the first embodiment.

Referring to FIG. 4 (A), when the first layer which is the lowermost layer of four-layer patterns 28A to 28D of multilayer printed board 26 is seen in plan view, secondary-side coils 22A and 22D are arranged on this plane as the same layer as pattern 28A of FIG. 3. That is, above-described secondary-side coils 22A and 22D may be considered as the same layer as pattern 28A (a film corresponding to pattern 28A), and are coils formed as a copper thin film pattern, for example.

Secondary-side coil 22A (first secondary-side coil) is arranged to include a region between outer leg 23A and middle leg 23C, and extends linearly in plan view at least in the region between outer leg 23A and middle leg 23C. That is, secondary-side coil 22A can be regarded as equivalent to half of a turn (0.5 turn) around outer leg 23A in a pseudo manner. At one end (on the let) side in FIG. 4 (A)) of the linear region interposed between outer leg 23A and middle leg 23C, secondary-side coil 22A is bent so as to intersect approximately perpendicularly to the linearly extending direction, and reference potential 7 is connected to this bent portion. The anode of rectifier element 31A (first rectifier element) is connected to an end (on the right side in FIG. 4 (A)) opposite to the above-described one end of the linear region of secondary-side coil 22A interposed between outer leg 23A and middle leg 23C. However, the mode having such a bent portion is not a limitation, but the coil may extend linearly from reference potential 7 to rectifier element 31A, for example.

Secondary-side coil 22D (third secondary-side coil) is arranged to include a region between outer leg 23B and middle leg 23C, and extends linearly in plan view at least the region between outer leg 23B and middle leg 23C to 0.5 turn around outer leg 23B in a pseudo-manner). At one end (on the right side in FIG. 4 (A)) of the linear region interposed between outer leg 23B and middle leg 23C, secondary-side coil 22D is bent so as to intersect approximately perpendicularly to the linearly extending direction, and reference potential 7 is connected to this bent portion. The anode of rectifier element 31D (third rectifier element) is connected to an end (on the left side in FIG. 4 (A) opposite to the above-described one end of the linear region of secondary-side coil 22D interposed between outer leg 23B and middle leg 23C. However, the mode having such a bent portion is not a limitation, but the coil may extend linearly from reference potential 7 to rectifier element 31D, for example.

Referring to FIG. 4 (B), when the second lowermost layer of four-layer patterns 28A to 28D of multilayer printed board 26 is seen in plan view, primary-side coil 21 is arranged on this plane as the same layer as pattern 28B of FIG. 3. That is, above-described primary-side coil 21 may be considered as the same layer as pattern 28B (a film corresponding to pattern 28B), and is a coil formed as a copper thin film pattern, for example.

Primary-side coil 21 is arranged to pass through the region between outer leg 23A and middle 23C, the region between outer leg 23B and middle leg 23C, and the region connecting these two regions. In more detail, primary-side coil 21 is in a mode of being spirally wound two turns around middle leg 23C, for example, as shown in the drawing. Spiral primary-side coil 21 is configured such that a gap is left between the first turn and the second turn to prevent them from being electrically short-circuited. Primary-side coil 21 extends linearly in each of the above-described regions, and is bent approximately perpendicularly at boundaries between the respective regions. Accordingly, primary-side coil 21 is wound around middle leg 23C so as to present a rectangular shape in plan view.

Referring to FIG. 4 (C), when the third lowermost layer of four-layer patterns 28A to 28D of multilayer printed board 26 is seen in plan view, primary-side coil 21 is arranged on this plane as the same layer as pattern 28C of FIG. 3. That is, above-described primary-side coil 21 may be considered as the same layer as pattern 28C to film corresponding to pattern 28C), and is a coil formed as a copper thin film pattern, for example.

Primary-side coil 21 shown in FIG. 4 (C) is in a mode of being spirally wound two turns around middle leg 23C, for example, approximately similarly to primary-side coil 21 shown in FIG. 4 (B). Two turns of primary-side coil 21 shown in FIG. 4 (B) and two turns of primary-side coil 21 shown in FIG. 4 (C) are electrically connected together at their ends by connection vias 25 extending in the vertical direction in FIG. 3 (thickness direction of multilayer printed board 26), and a combination of them functions as one primary-side coil 21. An end of primary-side coil 21 of FIG. 4 (B) opposite to the end connected to connection vias 25 corresponds to node 12 of FIG. 1, and an end of primary-side coil 21 of FIG. 4 (C) opposite to the end connected to connection vias 25 corresponds to node 13 of FIG. 1. A total of four turns of primary-side coil 21 is thereby formed.

Referring to FIG. 4 (D), when the uppermost layer of four-layer patterns 28A to 28D of multilayer printed board 26 is seen in plait view, secondary-side coils 22C and 22B are arranged on this plane as the same layer as pattern 28D of FIG. 3. That, is, above-described secondary-side coils 22C and 22B may be considered as the same layer as pattern 28D (a film corresponding to pattern 28D), and are coils formed as a copper thin film pattern, for example.

Secondary-side coil 22C (second secondary-side coil) is arranged to include a region between outer leg 23A and middle leg 23C, and extends linearly in plan view at least in the region between outer leg 23A and middle leg 23C (a 0.5 turn around outer leg 23A in a pseudo-manner). At one end (on the right side an FIG. 4 (B)) of the linear region interposed between outer leg 23A and middle leg 23C secondary-side coil 22C is bent so as to intersect approximately perpendicularly to the linearly extending direction, and reference potential 7 is connected to this bent portion.

The anode of rectifier element 31C (second rectifier element) is connected to an end (on the left side in FIG. 4 (A)) opposite to the above-described one end of the linear region of secondary-side coil 22C interposed between outer leg 23A and middle leg 23C. However, the mode having such a bent portion is not a limitation, but the coil may extend linearly from reference potential 7 to rectifier element 31C, for example.

Secondary-side coil 22B (fourth secondary-side coil) is arranged to include a region between outer log 23B and middle leg 23C, and extends linearly in plan view at least in the region between outer leg 23B and middle, leg 23C (a 0.5 turn around outer leg 23B in a pseudo-manner). At one end on the left side in FIG. 4 (B)) of the linear region interposed between outer leg 23B and middle leg 23C, secondary-side coil 22B is bent so as to intersect approximately perpendicularly to the linearly extending direction, and reference potential 7 is connected to this bent portion. The anode of rectifier element 31B (fourth rectifier element) is connected to an end (on the right side in FIG. 4 (B)) opposite to the above-described one end of the linear region of secondary-side coil 22B interposed, between outer leg 23B and middle leg 23C. However, the mode having such a bent portion is not a limitation, but the coil may extend linearly from reference potential 7 to rectifier demerit 31B, for example.

As described above, in multilayer printed board 26, primary-side and secondary-side coils 21 and 22 are formed to be stacked one on the other. Middle leg 23C of E-shaped core 23 extends through multilayer printed board 26 so as to be surrounded by these primary-side and secondary-side coils 21 and 22.

The portions of above-described secondary-side coils 22A to 22D (interposed between the outer and middle legs) extending linearly in plan view overlap each other at least partly. Therefore, secondary-side coils 22A to 22D arranged as merely a half turn (0.5 turn) are larger in width than primary-side coil 21 having a narrow width so as to enable spiral two-turn winding in the regions between outer legs 23A, 23B and middle leg 23C.

Since a voltage is applied to primary-side coil 21 in opposite directions in the first state and the second state as described above, electric current flows in this primary-side coil 21 in opposite directions in the first state and the second state. Next, changes in the flow of electric current in secondary-side coil 22 caused by this will be described.

Here, as indicated by the arrows in FIGS. 4 (B) and 4 (C), for example, the first state in which switching elements 11A and 11D (see FIG. 1) are turned on, so that a positive input voltage of DC power supply 6 is applied to primary-side coil 21, causing electric current to flow from node 12 toward node 13 of switching element 11 is discussed. At this time, electric current flows from the outside toward the inside of the spiral of primary-side coil 21 in FIG. 4 (B), and flows from the inside toward the outside of the spiral of primary-side coil 21 in FIG. 4 (C).

With this electric current, a magnetic flux S1 upward perpendicularly to the sheet of drawing occurs in middle leg 23C wound around primary-side coil 21, and a magnetic flux is created in a loop in accordance with two magnetic paths formed between outer legs 23A, 23B and middle leg 23C, respectively. Therefore, a magnetic flux S2 occurs in outer legs 23A and 23B upward perpendicularly to the sheet of drawing in the opposite direction to middle leg 23C.

Referring again to FIGS. 4 (A) and (D)), induced electromotive force occurs in secondary-side coils 22A and 22D so as to cancel out magnetic flux S1 in middle leg 23C in FIGS. 4 (B) and (C) described above, that is, such that magnetic flux S2 occurs, and electric current is going to flow. It is noted that, at this time, magnetic flux S1 is going to occur in outer legs 23A and 23B. Based on a similar theory to secondary-side coils 22A and 22D, electric current is also going to flow in secondary-side coils 22B and 22C. It is noted that the directions of the magnetic fluxes which are come to occur resulting from the situations shown in FIGS. 4 (B) and (C) are indicated in cores 23A to 23C shown in FIGS. 4 (A) and (D).

For that purpose, electric current is going to flow rightward in the drawing in secondary-side coils 22A and 22C, and leftward in the drawing in secondary-side coils 22B and 22D. However, the electric current which is going to flow in secondary-side coils 22B and 22C is interrupted by the rectifying function of rectifier elements 31C and 31B and does not flow. Actually, the electric current indicated by the arrows in FIG. 4 (A) flows only in secondary-side coils 22A and 22D so as to pass through rectifier elements 31A and 31D. Specifically, since secondary side coils 22A and 22D are magnetically coupled by E-shaped core 23 and I-shaped core 24, electric current flows in the opposite direction to the electric current flowing in primary-side coil 21 overlapping them in plan view.

Figure 5:
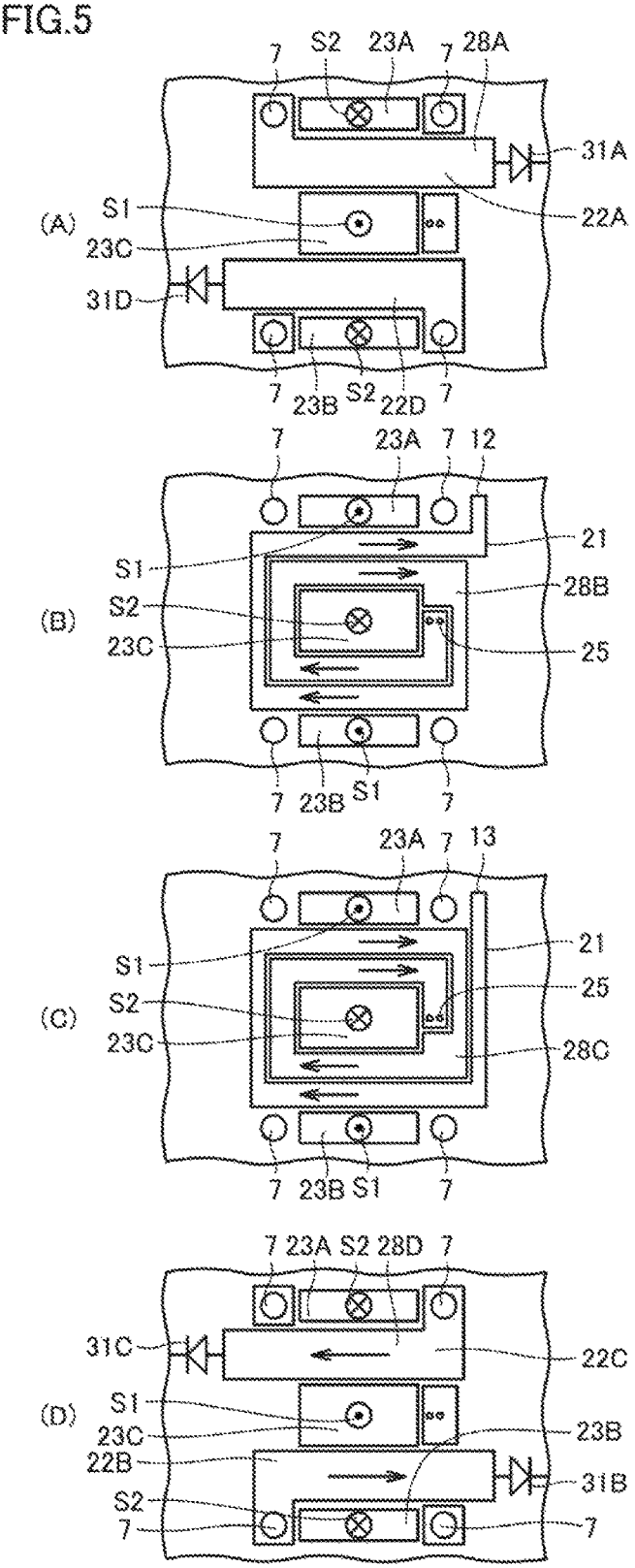
FIG. 5 shows a schematic plan view (A) showing a mode of coils and a second state of the coils in the first layer of the metallic thin film pattern in the millilayer printed board of FIG. 3 in the first example of the first embodiment, a schematic plan view (B) showing a mode of coils and the second state of the coils in the second layer of the metallic thin film pattern in the multilayer printed board of FIG. 3 in the first example of the first embodiment, a schematic plan view (C) showing a mode of coils and the second state of the coils in the third layer of the metallic thin film pattern in the multilayer printed board of FIG. 3 in the first example of the first embodiment, and a schematic plan view (D) showing a mode of coils and the second state of the coils in the fourth layer of the metallic thin film pattern in the multilayer printed board of FIG. 3 in the first example of the first embodiment.

Next, as indicated by the arrows in FIG. 5 (B) and FIG. 5 (C), the second state in which switching, elements 11B and 11C (see FIG. 1) are turned on, so that a negative input voltage of DC power supply 6 is applied to primary-side coil 21, causing electric current to flow from node 13 toward node 12 of switching element 11 is discussed. At this, time, electric current flows from the inside toward the outside of the spiral of primary-side coil 21 in FIG. 5 (B), and from the outside toward the inside of the spiral of primary-side coil 21 in FIG. 5 (C).

With these electric currents, contrary to the above case, magnetic flux S2 occurs in middle leg 23C wound around primary-side coil 21, and magnetic flux S1 occurs in outer legs 23A and 23B.

Referring to FIGS. 5 (A) and (D), an induced electromotive force occurs in secondary-side coils 22A and 22D so as to cancel out changes in magnetic flux occurred in middle leg 23C, that is, such that magnetic flux S1 occurs, and electric current is going to flow. It is noted that, a this time, magnetic flux S2 is going to occur in outer legs 23A and 23B. The same applies to secondary-side coils 22B and 22C. The directions of the magnetic fluxes which are going to occur are indicated in cores 23A to 23C in FIGS. 5 (A) and (D).

For that purpose, electric current is going to flow leftward in the drawing in secondary-side coils 22A and 22C, and rightward in the drawing in secondary-side coils 22B and 22D. However, the electric current which is going to flow in secondary-side coils 22A and 22D is interrupted by the rectifying function of rectifier elements 31A and 31D, and does not flow. Actually, the electric current indicated by the arrows in FIG. 5 (D) flows only in secondary-side coils 22B and 22C so as to pass through rectifier elements 31B and 31C. Similarly to the above case, electric current flows in secondary-side coils 22B and 22C in the opposite direction to the electric current flowing in primary-side coil 21 overlapping them m plan view.

Next, changes in voltage applied to each, coil between the above-described respective states will be described using FIG. 6.

Figure 6:
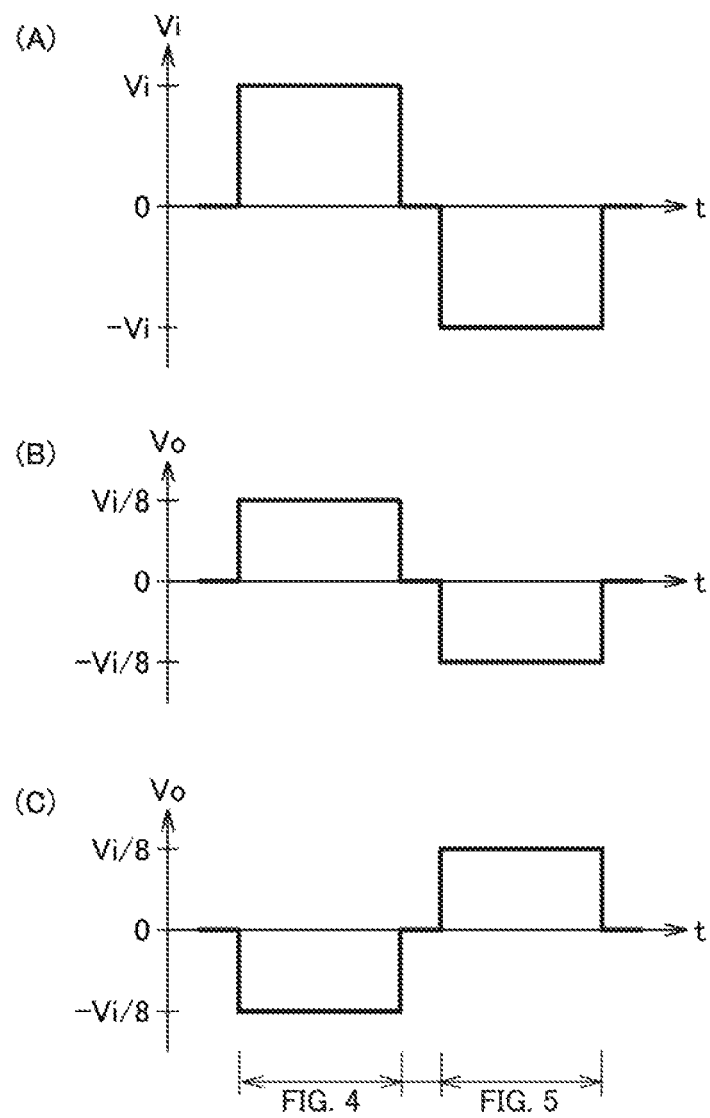
FIG. 6 shows a graph (A) showing time changes in voltage applied to the primary-side coil, a graph (B) showing time changes in voltage applied to secondary-side coils 22A and 22D, and a graph (C) showing time changes in voltage applied to secondary-side coils 22B and 22C.

Referring to FIG. 6 (A), positive voltage Vi is first applied to primary-side coil 21 by primary-side drive circuit 1 in the first state shown in FIG. 4. At this time, a positive voltage is applied to secondary-side coils 22A and 22D in which electric current flows, as shown in FIG. 6 (B). However depending on the ratio of the number of turns of primary-side coil 21 to that of secondary-side coil 22 in step-down transformer 2, the voltage in secondary-side coil 22 is lower than the voltage in primary side coil 21, and is Vi/8 here. Referring to FIG. 6 (C), at this time, a negative voltage reversed in phase (shifted by 180°) relative to secondary-side coils 22A and 22D is applied to secondary-side coils 22B and 22C, and is −Vi/8 here. Such a voltage is applied to secondary-side coils 22B and 22C, but the electric current is interrupted by rectifier elements 31B and 31C as described above.

Next, when in the second state shown in FIG. 5, a negative voltage −Vi reversed in phase relative to the first state is applied to primary-side coil 21 as shown in FIG. 6 (A). At this time, as shown in FIG. 6 (B), a negative voltage −Vi/8 is applied to secondary-side coils 22A and 22D in which electric current does not flow, and as shown in FIG. 6 (C), a positive voltage Vi/8 is applied to secondary-side coils 22B and 22C in which electric current flows.

Both in the above-described first and second states, a mode is brought about in which a voltage produced in secondary-side coil 22 (output from secondary-side coil 22) is similar to the DC Voltage applied only in one direction by rectification of electric current in rectifier element 31, and is further smoothed in smoothing circuit 4 (smoothing capacitor 41 and smoothing coil 42). A smoothed DC voltage Vo is thereby applied to the both ends of smoothing capacitor 41.

Next, variations of the present embodiment will be described.

Figure 7:
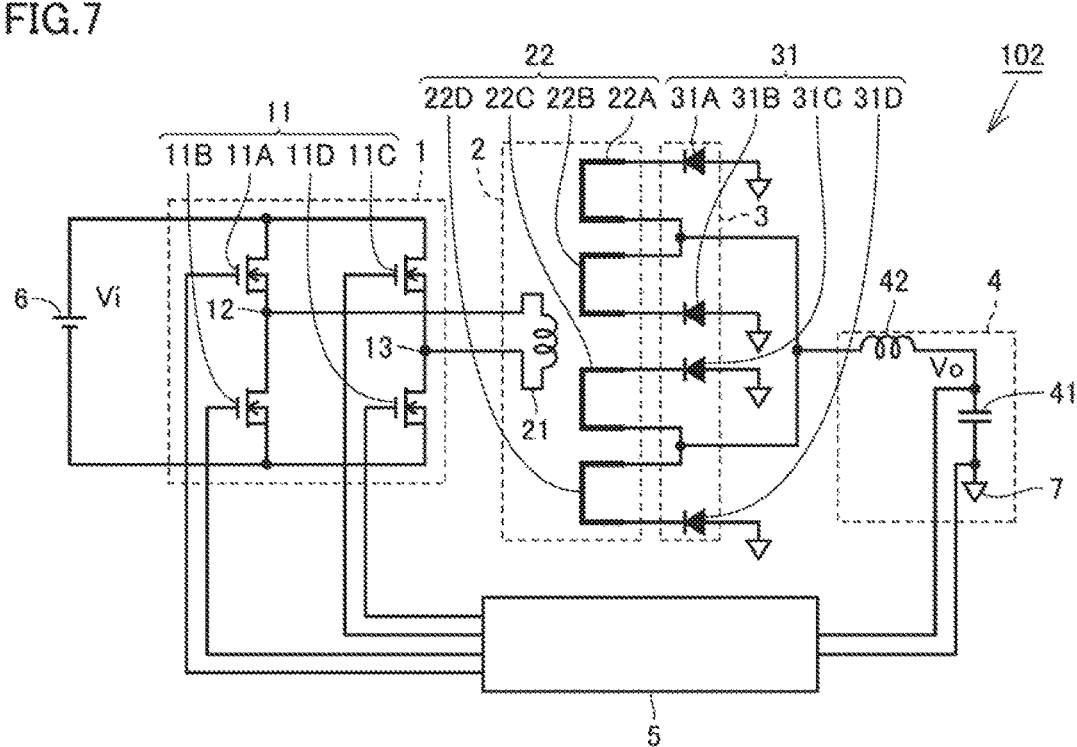
FIG. 7 is a circuit block diagram showing a second example of the insulation type step-down converter of the first embodiment.
Figure 8:
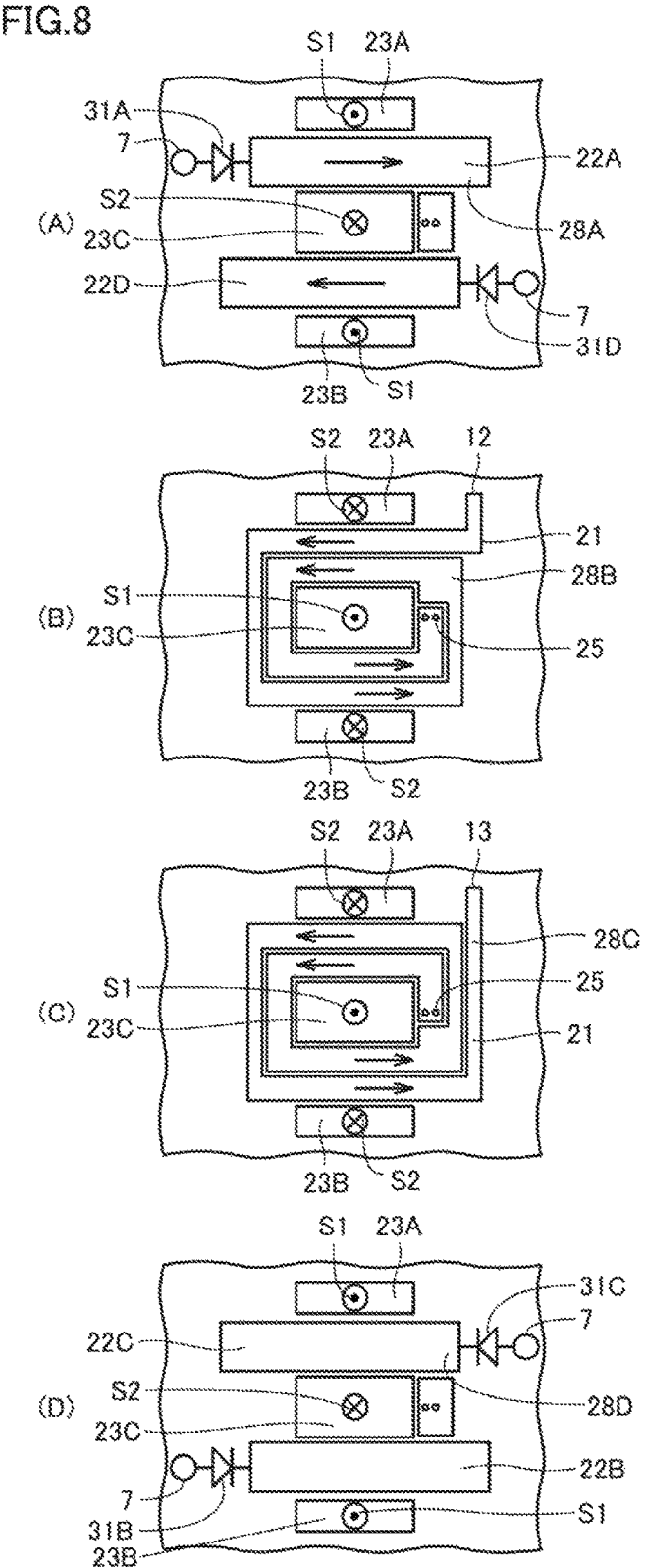
FIG. 8 shows a schematic plan view (A) showing a mode of coils and the first state of the coils in the first layer of the metallic thin film pattern in the multilayer printed board of FIG. 3 in a second example of the first embodiment, a schematic plan view (B) showing a mode of coils and the first state of the coils in the second layer of the metallic thin film pattern in the multilayer printed board of FIG. 3 in the second example of the first embodiment, a schematic plan view (C) showing a mode of coils and the first state of the coils in the third layer of the metallic thin film pattern in the multilayer printed board of FIG. 3 in the second example of the first embodiment, and a schematic plan view (D) showing a mode of coils and the first state of the coils in the fourth layer of the metallic thin film pattern in the multilayer printed board of FIG. 3 in the second example of the first embodiment.
Figure 9:
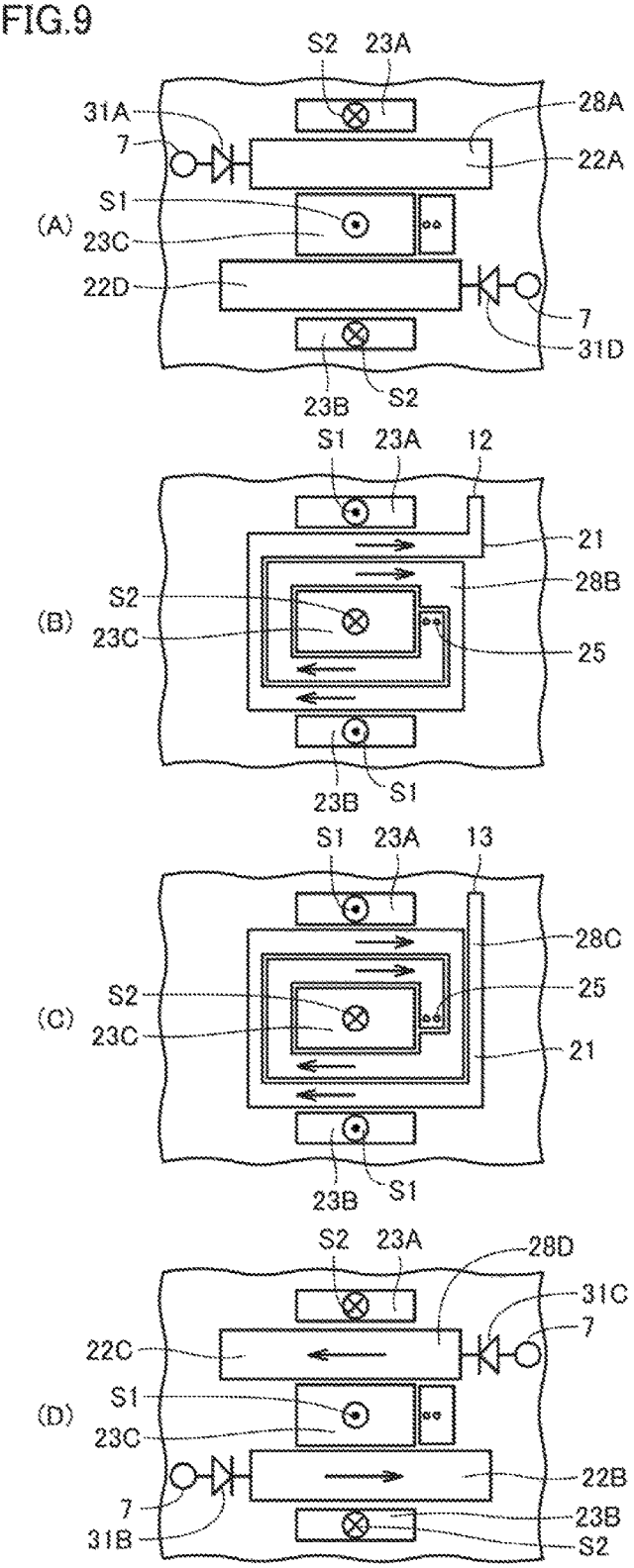
FIG. 9 is a schematic plan view (A) showing a mode of coils and the second state of the coils in the first layer of the metallic thin film pattern in the multilayer printed board of FIG. 3 in the second example of the first embodiment, a schematic plan, view (B) show in a mode of coils and the second state of the coils in the second layer of the metallic thin film pattern in the multilayer printed board of FIG. 3 in the second example of the first embodiment, a schematic plan view (C) showing a mode of coils and the second state of the coils in the third layer of the metallic thin film pattern in the multi layer printed board of FIG. 3 in the second example of the first embodiment, and a schematic plan view (D) showing a mode of coils and the second state of the coils in the fourth layer of the metallic thin pattern in the multilayer printed board of FIG. 3 in the second example of the first embodiment.

Referring to FIGS. 7, 8 and 9, an insulation type step-down converter 102 of a second example of the present embodiment basically has a similar configuration to insulation type step-down converter 101 of the first example. However, insulation type step-down converter 102 differs from insulation type step-down converter 101 in that rectifier elements 31A to 31D are connected to the same end of the pair of ends of each of secondary-side coils 22A to 22D to which reference potential 7 is connected.

Specifically, one ends of secondary-side coils 22A to 22D are connected to the cathodes of rectifier elements 31A to 31D, respectively, and the other ends are connected to smoothing coil 42. The anodes of rectifier elements 31A to 31D are connected to reference potential 7. It is noted that in FIGS. 8 (A) and (D) secondary-side coils 22A to 22D are not bent at the ends connected to rectifier elements 31A to 31D, respectively, different from FIGS. 4 (A) and (D), but this is not an essential part of the embodiment. In FIGS. 8 (A) and (D), secondary-side coils 22A to 22D may be bent similarly to those in FIGS. 4 (A) and (D).

Referring to FIG. 8, the operation in the first state in which switching elements 11A and 11D (see FIG. 1) are turned on, that is, the direction of the magnetic flux in core 23 and the directions of electric currents in primary-side coil 21 and secondary-side coil 22 are basically similar to those in FIG. 4. Referring to FIG. 9, the operation in the first state in which switching elements 11B and 11C (see FIG. 1) are turned on, that is, the direction of the magnetic flux in core 23 and the directions of electric currents in primary-side coil 21 and secondary-side coil 22 are basically similar to those in FIG. 5.

It is noted that since the remaining configuration of the second example of the present embodiment is approximately the same as that of the first example of the present embodiment, the same reference characters are allotted to the same elements, and description thereof will not be repeated.

Figure 10:
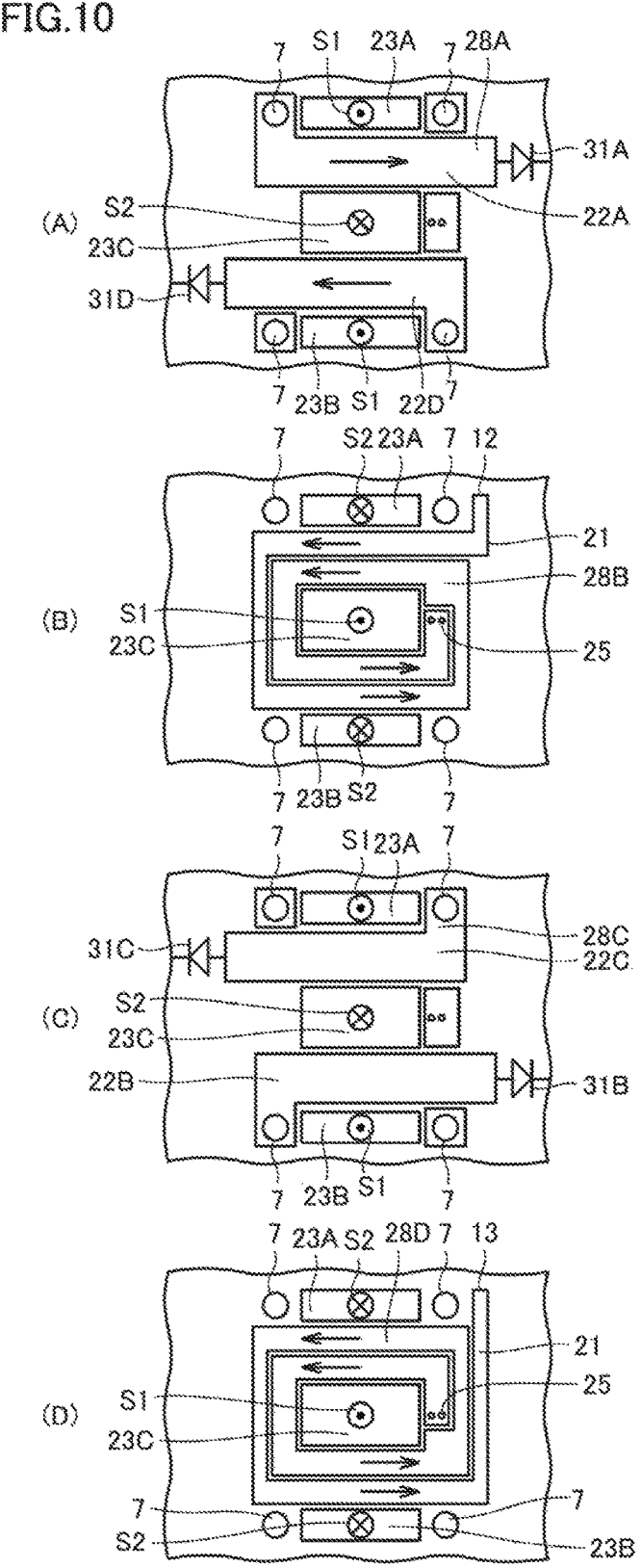
FIG. 10 shows a schematic plan view (A) showing a mode of coils and the first state of the coils in the first layer of the metallic thin film pattern in the multilayer printed board of FIG. 3 in a third example of the first embodiment, a schematic plan view (B) showing a mode of coils and the first state of the coils in the second layer of the metallic thin film pattern in the multilayer printed board of FIG. 3 in the third example of the first embodiment, a schematic plan view (C) showing a mode of coils and the first state of the coils in the third layer of the metallic thin film pattern in the multilayer printed board of FIG. 3 in the third example of the first embodiment, and a schematic plan view (D) showing a mode of coils and the first state of the coils in the fourth layer of the as thin film pattern in the multilayer printed board of FIG. 3 in the third example of the first embodiment.

Next, referring to FIG. 10 (A) to (D), an insulation type step-down converter of a third example of the present embodiment basically has a similar configuration to the first example. Here, however, third-layer pattern 28C and fourth-layer pattern 28D are configured in a reverse manner to FIGS. 4 (C) and (D) although first-layer pattern 28A, and second-layer pattern 28B of multilayer printed board 26 (see FIG. 3) are the same as those in FIGS. 4 (A) and (B). That is, secondary-side coils 22C and 22B identical to those shown in FIG. 4 (D) correspond to third-layer pattern 28C shown in FIG. 10 (C), and primary-side coil 21 identical to that shown in FIG. 4 (C) corresponds to fourth-layer pattern 28D shown in FIG. 10 (D).

That is, in the first example, patterns 28A, 28B, 28C, and 28D are stacked in this order so as to correspond to secondary-side coil 22, primary-side coil 21, primary-side coil 21, and secondary-side coil 22, respectively. However, this is not a limitation, but patterns 28A, 28B, 28C, and 28D may be stacked in this order so as to correspond to secondary-side coil 22, primary-side coil 21, secondary-side coil 22, and primary-side coil 21, respectively, as in the third example.

Figure 11:
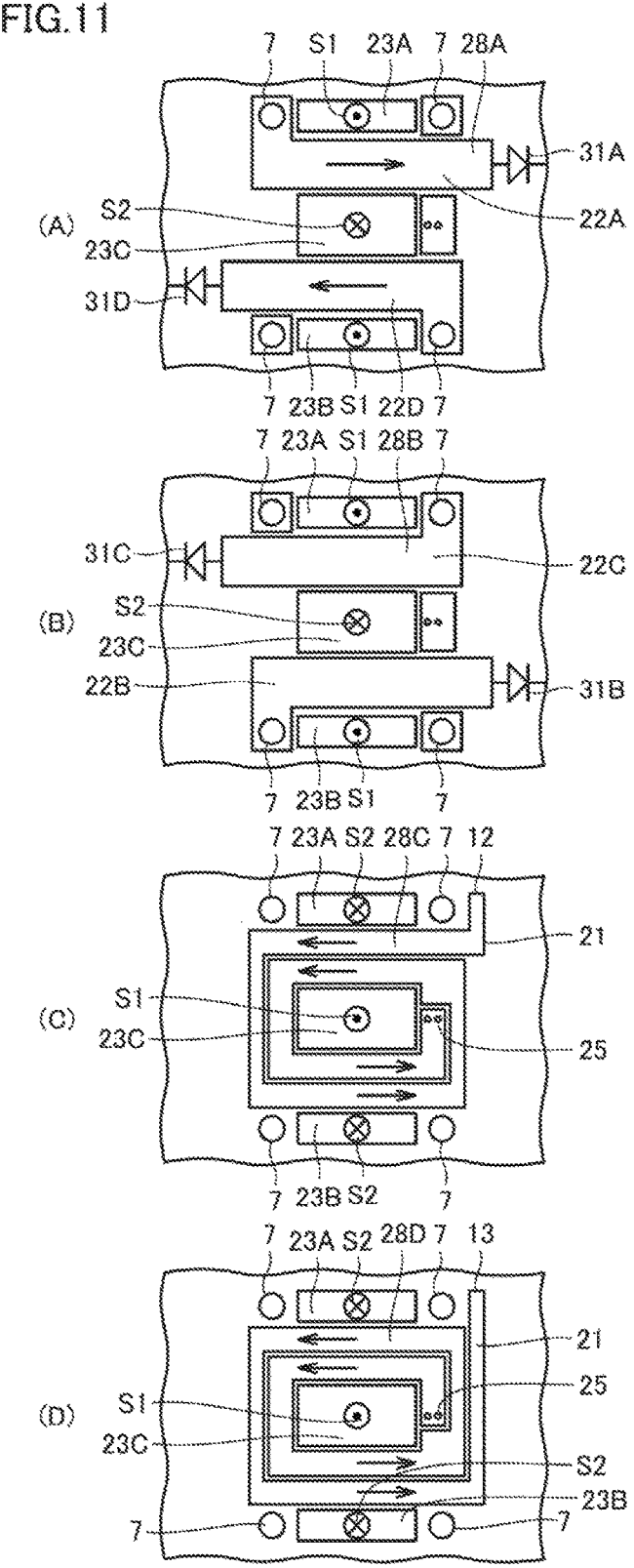
FIG. 11 shows a schematic plan view (A) showing a mode of coils and the first state of the coils in the first layer of the metallic thin film pattern in the multilayer printed board of FIG. 3 in as fourth example oldie first embodiment, a schematic plan view (B) showing a mode of coils and the first state of the coils in the second layer of the metallic thin film pattern in the multilayer printed board of FIG. 3 in the fourth example of the first embodiment, a schematic plan view (C) showing a mode of coils and the first state of the coils in the third layer of the metallic thin film pattern in the multilayer printed board of FIG. 3 in the fourth example of the first embodiment, and a schematic plan view (D) showing a mode of coils and the first state of the coils in the fourth layer of the metallic thin film pattern in the multilayer printed board of FIG. 3 in the fourth example of the first embodiment.

Referring to FIG. 11 (A) to (D), an insulation type step-down converter of a fourth example of the present embodiment basically has a similar configuration to the first example. Here, however, patterns 28A, 28B, 28C, and 28D are stacked in this order so as to correspond to secondary-side coil 22, secondary-side coil 22, primary-side coil 21, and primary-side coil 21, respectively. That is, secondary-side coils 22C and 22B identical to those shown in FIG. 4 (D) correspond to second-layer pattern 28B shown in FIG. 11B, and primary-side coil 21 identical to that shown in FIG. 4 (B) corresponds to third-layer pattern 28C shown in FIG. 11 (C). Primary-side coil 21 identical to that shown in FIG. 4 (C) corresponds, to fourth-layer pattern 28D shown in FIG. 11 (D).

FIGS. 10 and 11 are different only in the order of stacking of the respective layers, and the mode of each layer is identical to any of FIG. 4 (A) to (D). Therefore, both in the third and fourth examples, the operations in the above-described first and second states are similar to those in the first and second examples.

The third and fourth examples of the present embodiment are different from the first example of the present embodiment only in the above points, and the insulation type step-down converters of the third and fourth examples of the present embodiment have a circuit diagram similar to the circuit block diagram of insulation type step-down converter 101 of the first example shown in FIG. 1. Therefore, the same reference characters are allotted to the same elements, and description thereof will not be repeated.

It is noted that according to the present embodiment, in each of the above-described examples, the first secondary-side coil and the third secondary-side coil are arranged on the same first layer (on the same plane), and the second secondary-side coil and the fourth secondary-side coil are arranged on the same second layer (on the same plane) different from the above-described first layer. However this is not a limitation, but the first secondary-side coil and the fourth secondary-side coil may be arranged on the same first layer or second layer, for example. In this case, secondary-side coil 22A serves as the first secondary-side coil, and secondary-side coil 22D serves as the fourth secondary-side coil, for example.

Here, operation effects of the insulation type step-down converters of the above-described present embodiment will be described.

First, voltages in opposite directions to each other can be applied to primary-side coil 21 by primary-side drive circuit 1 at regular time intervals. A DC input Voltage can thereby be converted into an AC voltage, which allows a step-down by the mutual it in step-down transformer 2.

As shown in FIG. 4 and FIG. 5, for example, primary-side coil 21 and secondary-side coil 22 are arranged so as to overlap each other at least partly. Therefore, the mutual induction effect in which electric current is going to flow to secondary-side coil 22 in the direction opposite to the direction of electric current in primary-side coil 21 can be highly obtained so as to cancel out changes in magnetic flux caused by the electric current in primary-side coil 21.

In the present embodiment, rectifier element 31 rectifies the electric current in secondary-side coil 22 which is going to flow so as to produce a magnetic flux which cancels out changes in magnetic fluxes S1, S2 passing through middle leg 23 each time when the direction of electric current flowing in primary-side coil 21 is changed between the two states shown in FIGS. 4 and 5. That is, here, electric current flows alternately only in either secondary-side coil 22A or 22C arranged between outer leg 23A and middle leg 23C and either secondary-side coil 22B or 22D arranged between outer leg 23B and middle leg 23C.

By the rectification performed by rectifier element 31 such that electric current flows alternately as described above, an AC voltage obtained by mutual induction between primary-side coil 21 and secondary-side coil 22 can be converted into a DC voltage to obtain a DC output. Furthermore, the smoothing circuit can further stabilize the DC output value.

For example, the directions of electric currents flowing simultaneously in secondary-side coil 22A and secondary-side coil 22D are opposite to each other, and the directions of electric currents flowing simultaneously in secondary-side coil 22B and secondary-side coil 22C are opposite to each other. Accordingly, two linear secondary-side coils (equivalent to a 0.5 turn) in which electric currents flow simultaneously can be collectively made equivalent to a turn of a coil in a pseudo manner. This can cause step-down transformer 2 to achieve the step-down function using a turn of secondary-side coil 22.

However, although the state of a turn is created, in a pseudo, manner as described above, the circuit as a whole is in the state in which secondary-side coils 22A to 22D of 0.5 turn are aligned. Therefore, when considering the step-down ratio of step-down transformer 2, whole secondary side coil 22 can be considered to be equivalent to a coil of 0.5 turn combining these plurality of secondary-side coils 22A to 22D.

Here, the configuration of a typical step-down transformer will be described as a comparative example. In the typical step-down transformer, the primary-side and secondary-side coils are both wound at least one or more turns in order to achieve the function as a transformer. That is, in the case of causing a voltage of ⅛ of the voltage in the primary-side coil to be produced in the secondary-side coil for example, the primary-side coil needs to be wound eight or more turns at the minimum and the secondary-side coil needs to be wound one or more turns. As the step-down ratio increases, the number of turns of the primary-side coil increases further. In this case, particularly in order to avoid an increase in the cross section of the whole primary-side coil, it is necessary to reduce the cross section of the winding wire of the primary-side coil. Then, the amount of heat generated by the electric current flowing in the primary-side coil may increase to result in a malfunction in the whole insulation type step-down converter or the like.

Therefore in the present embodiment, secondary-side coil 22 wound a 0.5 turn between outer legs 23A, 23B and middle leg 23C is adopted. Accordingly, to achieve the same step-down ratio as the above-described comparative example, the number of turns of primary-side coil 21 can be reduced to four turns in total, as shown in FIGS. 4 (B) and (C). Accordingly, the same step-down ratio as in the comparative example can be achieved without reducing the cross section of the winding wire of primary-side coil 21, which can minimize an increase in heat generated by on primary-side coil 21. Since the number of turns of the secondary-side coil is small, the current-carrying distance of the secondary-side coil can be shortened.

Since secondary-side coil 22 extends linearly in plan view, the flow of electric current in secondary-side coil 22 is nearly linear. Therefore, electric current flows uniformly without concentrating on the neighborhood of the inner periphery of the coil as in a typical wound coil with many bent portions, for example. Also from this viewpoint, it can be said that heat generation can be reduced and distributed in the present embodiment.

Regarding the present embodiment which enables reduction of heat generation as described above, the radiation path of the above-described step-down transformer will be described finally using FIG. 12.

Figure 12:
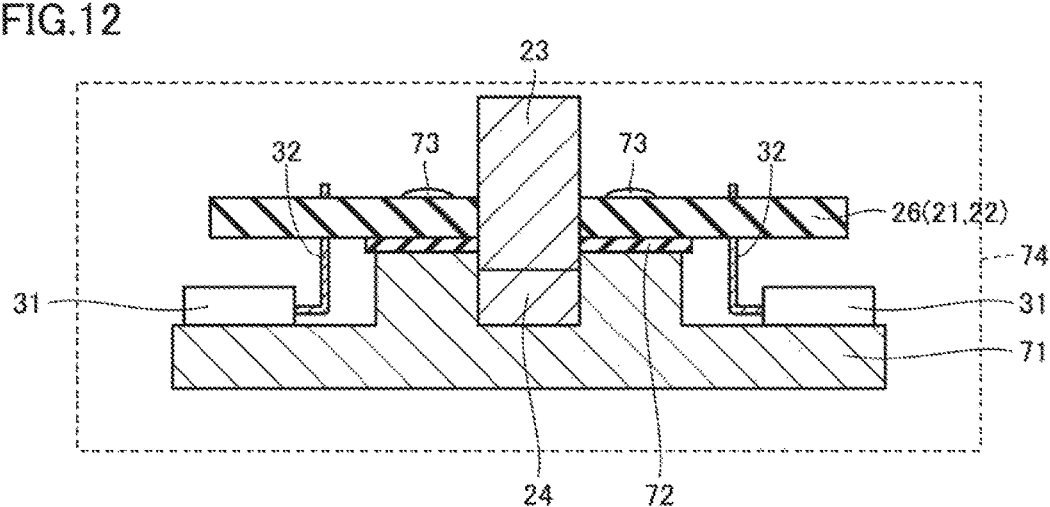
FIG. 12 is a schematic sectional view showing a mode in which a portion along the line XII-XII in FIG. 2 according to the first embodiment has been assembled and set in a radiator.

Referring to FIG. 12, in the step-down transformer after assembly at a portion along the line XII-XII of FIG. 2, one end of a pair of ends of each of secondary-side coils 22 (22A-22D) formed in multilayer printed board 26 in the above-described mode is (electrically) connected to a corresponding one of rectifier elements 31 (31A-31D) with a wire 32, although not clearly shown in the drawing. On the other hand, the other end opposite to the above-described one end of a pair of ends of secondary-side coil 22 (22A-22D) leads to a radiator 71.

Specifically, multilayer printed board 26 is mounted so as to come into contact with radiator 71 with an insulating sheet 72 interposed therebetween. In other words, insulating sheet 72 is mounted on radiator 71, and multilayer printed board 26 is mounted on insulating sheet 72 such that part of a surface of multilayer printed board 26 is in contact with insulating sheet 72. Here, secondary-side coil 22 leading to radiator 71 covers not only the case in which secondary-side coil 22 is directly connected to radiator 71, but also the case in which they are connected to each other with another component, such as insulating sheet 72, interposed therebetween. Therefore, secondary-side coil 22 leading to radiator 71 includes both the case in which secondary-side coil 22 and radiator 71 are electrically connected and the case in which they are not connected. It is noted that the sectional shape of radiator 71 is merely an example, and is not limited to this.

Radiator 71 functions as reference potential 7 (see FIGS. 1 and 4) on the secondary side in insulation type step-down converters 101, 102 of the present embodiment. Secondary-side coil 22 of multilayer printed board 26 is preferably fixed to radiator 71 with screws 73. With these screws 73, multilayer printed board 26 can be stably fixed to radiator 71, and heat and electricity can be easily transferred from secondary-side coil 22 to radiator 71 through screws 73. Heat generated by secondary-side coil 22 can also be transferred through the contact surface between pattern 28A (see FIG. 3) of the lowermost layer of multi layer printed board 26 and radiator 71. Secondary-side coil 22 and radiator 71 can be electrically connected to each other through the contact surface between pattern 28A (see FIG. 3) of the lowermost layer of multilayer printed board 26 and radiator 71.

Summarizing the foregoing, there are three heat transfer paths in total (partly not shown) from secondary-side coil 22 (pattern 28A) of multilayer printed board 26 to radiator 71. Specifically, the three paths include a path along which heat is directly transferred from secondary-side coil 22 to radiator 71, a path along which heat is transferred from secondary-side coil 22 to radiator 71 through screws 73 fixing secondary-side coil 22 (with screws 73 interposed therebetween), and a path along which heat is transferred from secondary-side coil 22 to radiator 71 through insulating sheet 72. Among them, the above-described first and second paths can also serve as paths of electric currents from secondary-side coil 22 to radiator 71.

The surfaces of I-shaped core 24 and E-shaped core 23 are partly in contact with the top of radiator 71, and rectifier element 31 is placed on radiator 71 (to be in contact therewith). Accordingly, heat generated by cores 24, 23 and rectifier element 31 can also be easily transferred to radiator 71.

It is noted that radiator 71 can be air-cooled or water-cooled to radiate heat having received.

In multilayer printed board 26, primary-side coil 21 and secondary-side coil 22 need to be insulated by insulating substrate body 27 shown in FIG. 3 such that a relatively strict standard is met. However, insulating sheet 72 interposed between secondary-side coil 22 corresponding to pattern 28A of the lowermost layer of multilayer printed board 26 and radiator 71 which is reference potential 7 on the secondary side, however, does not need to meet a very strict insulating standard. Since insulating sheet 72 can thus be reduced in thickness, heat generated by primary-side coil 21 and secondary-side coil 22 can be transferred to radiator 71 more easily because of the interposition of insulating sheet 72.

Primary-side coil 21 in multilayer printed board 26 has two paths: one for transferring heat to radiator 71 through substrate bode 27 of multilayer printed board ins 26; and the other for transferring heat to radiator 71 through connection vias 25 (see FIGS. 4 (B) and (C) and insulating sheet 72. Therefore, heat generated by primary-side coil 21 can be radiated with high efficiency.

Radiator 71 described above may be integral with a housing 74 indicated by the broken line in FIG. 12 which houses respective components of insulation type step-down converters 101, 102 of the present embodiment. In this case, the other end opposite to the above-described one end of a pair of ends of each secondary-side coil 22 (22A-22D) leads to housing 74.

Second Embodiment

A second embodiment differs from the first embodiment particularly in the configuration of first- and fourth-layer coils of multilayer printed board 26. First, the structure of each component constituting step-down transformer 2 in the present embodiment will be described using FIGS. 13 to 16.

Figure 13:
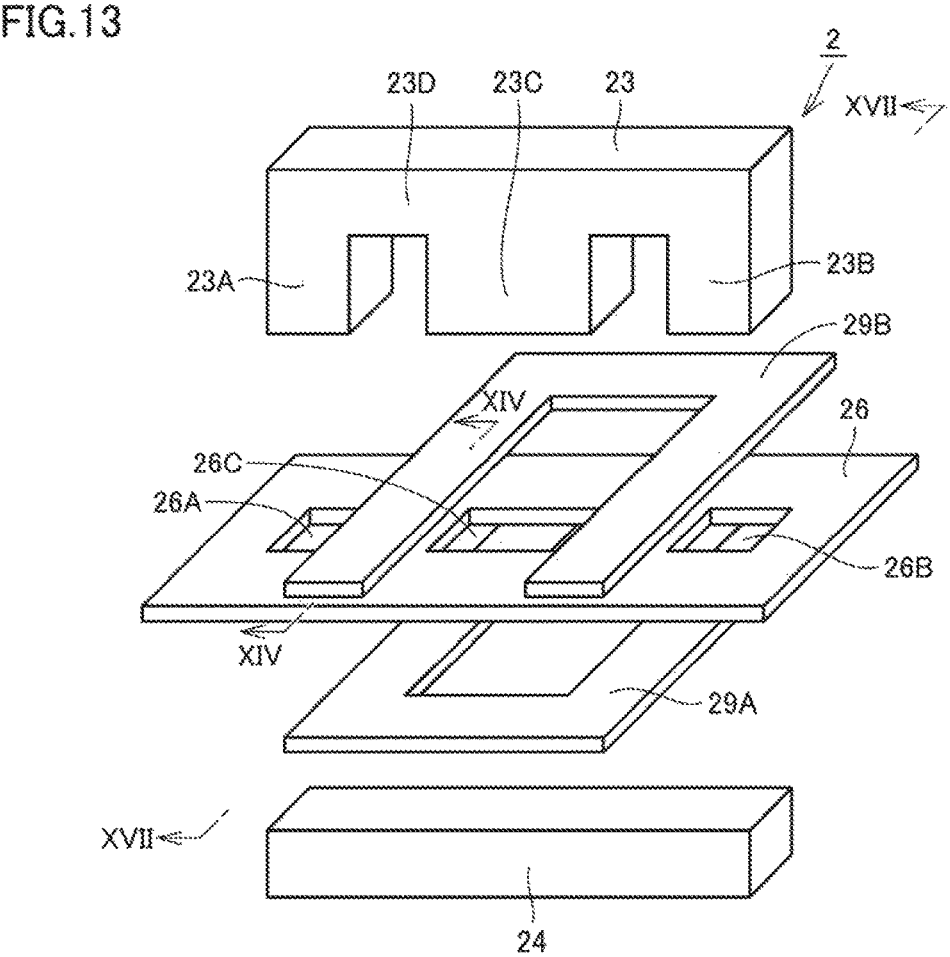
FIG. 13 is an exploded perspective view showing arrangement of cores and a multilayer printed board constituting a step-down transformer of a second embodiment.

Referring to FIG. 13, step-down transformer 2 of the present embodiment mainly has E-shaped core 23 (core), I-shaped core 24 and multilayer printed board 26, basically similarly to step-down transformer 2 of the first embodiment.

Figure 14:
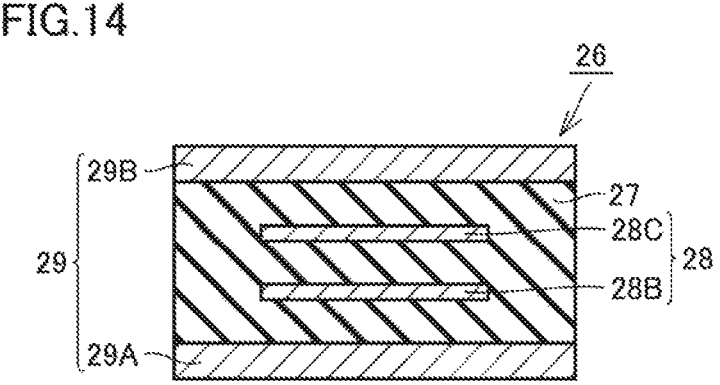
FIG. 14 is a schematic sectional view showing a structure of the multilayer printed board at a portion taken along the line XIV-XIV of FIG. 13.

Referring to FIGS. 13 and 14, in the present embodiment, thin film patterns of metal (copper) similar to those of the first embodiment are formed as second-layer pattern 28B and third-layer pattern 28C in the coils formed in four-layer multilayer primed board 26. That is, as shown in FIG. 15 (B), (C) and FIGS. 16 (B) and (C), a total of four turns of primary-side coil 21 is formed as a copper thin film pattern, for example, similarly to FIG. 4 (B), (C) and FIGS. 5 (B) and (C).

In the present embodiment, however, a metal plate 29A and a metal plate 29B (collectively called a metal plate 29), each made of copper, for example, are arranged as the first layer as the lowermost layer and the fourth layer as the uppermost layer in the coils formed in four-layer multilayer printed board 26, instead of a metal thin film patterns being formed. In FIG. 14, metal plates 29A and 29B are formed to come into contact with the lowermost surface and uppermost surface of substrate body 27, respectively, similarly to patterns 28A and 28D in FIG. 3. It is noted that aluminum or the like may be used instead of copper.

Referring to FIG. 14, metal plates 29A and 29B are formed thicker than patterns 28B and 28C. Metal plates 29A and 29B may be formed to have a width, longer than the width of multilayer printed board 26 in the depth direction in FIG. 13, that is, to protrude from the both ends of multilayer printed board 26 in the depth direction in FIG. 13. It is noted that, as shown in FIG. 14, metal plates 29A and 29B and patterns 28B and 28C are spaced from each other by substrate body 27 of an insulating, material (so as not to be short-circuited to each other), similarly to the first embodiment.

Figure 15:
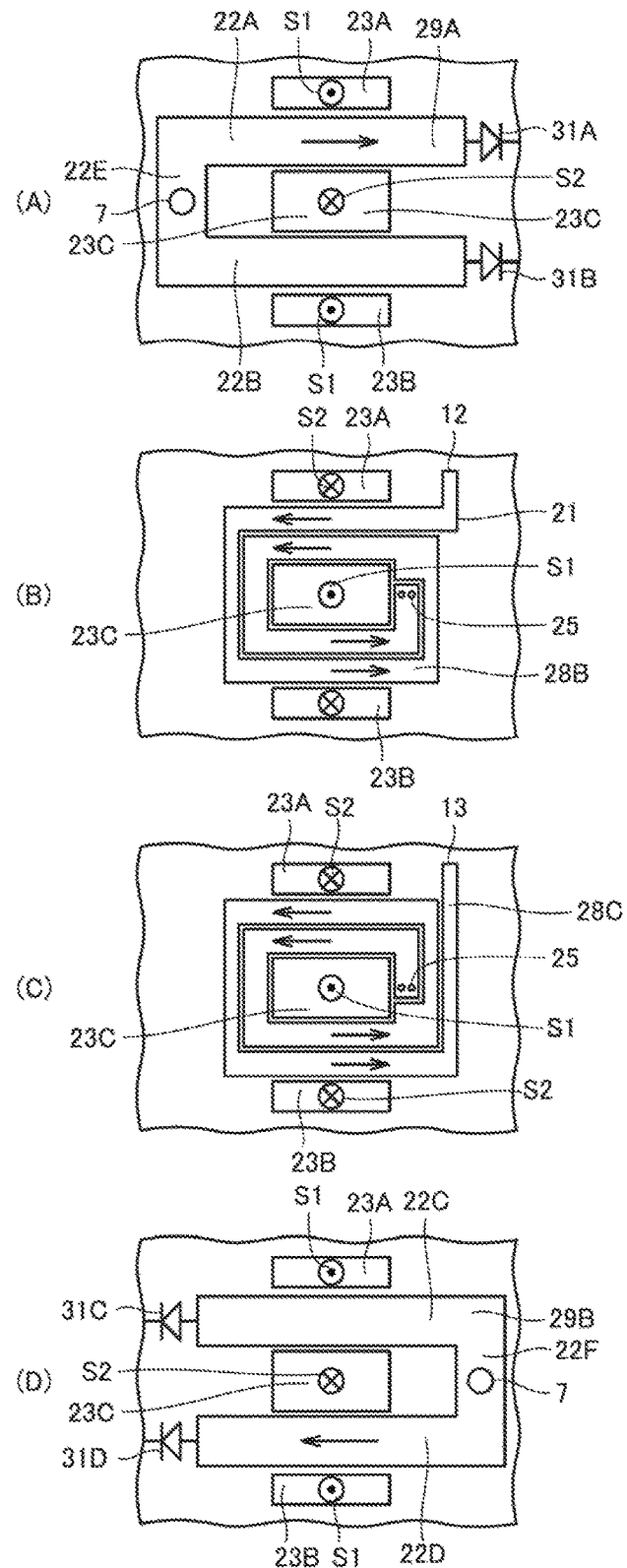
FIG. 15 shows a schematic plan view (A) showing a mode of coils and the first state of the coils in the first layer of the metallic thin film pattern in the multilayer printed board of FIG. 3 in a first example of the second embodiment, a schematic plan view (B) showing a mode of coils and the first state of the coils in the second layer of the metallic thin him pattern in the multilayer printed board of FIG. 3 in the first example of the second embodiment, a schematic plan view (C) showing a mode of coils and the first state of the coils in the third layer of the metallic thin film pattern in the multilayer printed board of FIG. 3 in the first example of the second embodiment, and a schematic plan view (D) showing a mode of coils and the first state of the coils in the fourth layer of the metallic thin film pattern in the multilayer printed board of FIG. 3 in the first example of the second embodiment.

Referring to FIG. 15 (A), when the first layer as the lowermost layer among the four layers (metal plates 29A, 29B and patterns 28B, 28C) of multilayer printed board 26 is seen in plan view, secondary-side coils 22A and 22B are arranged as the same layer as metal plate 29 of FIG. 14 on this plane.

Secondary-side coil 22A (first secondary-side coil) is arranged to include a region between outer leg 23A and middle leg 23C, and extends linearly (a 0.5 turn) in plan view at least in the region between outer leg 23A and middle leg 23C. Secondary-side coil 22B (third secondary-side coil) is arranged to include a region between outer leg 23B and middle leg 23C, and extends linearly (a 0.5 turn) in plan view at least in the region between outer leg 23B and middle leg 23C.

A connecting portion 22E is formed at the left ends of these secondary-side coils 22A and 22B in FIG. 15 (A) so as to cross approximately perpendicularly to secondary-side coils 22A and 22B. That is, secondary-side coils 22A, 22B and connecting portion 22E are connected integrally as metal plate 29A. At the center of connecting portion 22E, a through-hole is formed which extends therethrough in the thickness direction from one main surface to the other main surface of metal plate 29A, and metal plate 29A leads to reference potential 7 via this through-hole. The anode of rectifier element 31A is connected to an end of secondary-side coil 22A (on the right side in FIG. 15 (A)) opposite to the end connected to connecting portion 22E. Similarly, the anode of rectifier element 31B is connected to an end of secondary side coil 22B (on the right side in FIG. 15 (A) opposite to the end connected to connecting portion 22E.

Also similarly, referring to FIG. 15 (D), when the fourth layer as the uppermost layer among the four layers of multi layer printed board 26 is seen in plan view, secondary-side coils 22C and 22D are arranged as the same layer as metal plate 29B of FIG. 14 on this plane.

Secondary-side coil 22C (second secondary-side coil) is arranged to include the region between outer leg 23A and middle leg 23C, and extends linearly (a 0.5 turn) in plan view at least in the region between outer leg 23A and middle leg 23C. Secondary-side coil 22D (fourth secondary-side coil) is arranged to include the region between outer leg 23B and middle leg 23C, and extends linearly (a 0.5 turn) in plan view at least in the region between outer leg 23B and middle leg 23C.

A connecting portion 22F is formed at the right ends of these secondary-side cods 22C and 22D in FIG. 15 (D) so as to cross approximately perpendicularly to secondary-side coils 22C and 22D. That is, secondary-side coils 22C, 22D and connecting portion 22F are connected integrally as metal plate 29B. Connecting portion 22F has a through-hole similar to that of connecting portion 22E, and metal plate 29B leads to reference potential 7 via this through-hole. The anode of rectifier element 31C is connected to an end of secondary-side coil 22C on the left side in FIG. 15 (D). The anode of rectifier element 31D is connected to an end of secondary-side coil 22D on the left side in FIG. 15 (D).

The flow of electric currents in primary-side coil 21 and secondary-side coil 22 in the insulation type step-down converter of the present embodiment having the above configuration changes basically similarly to the first embodiment based on a similar principle to that of the first embodiment.

Figure 16:
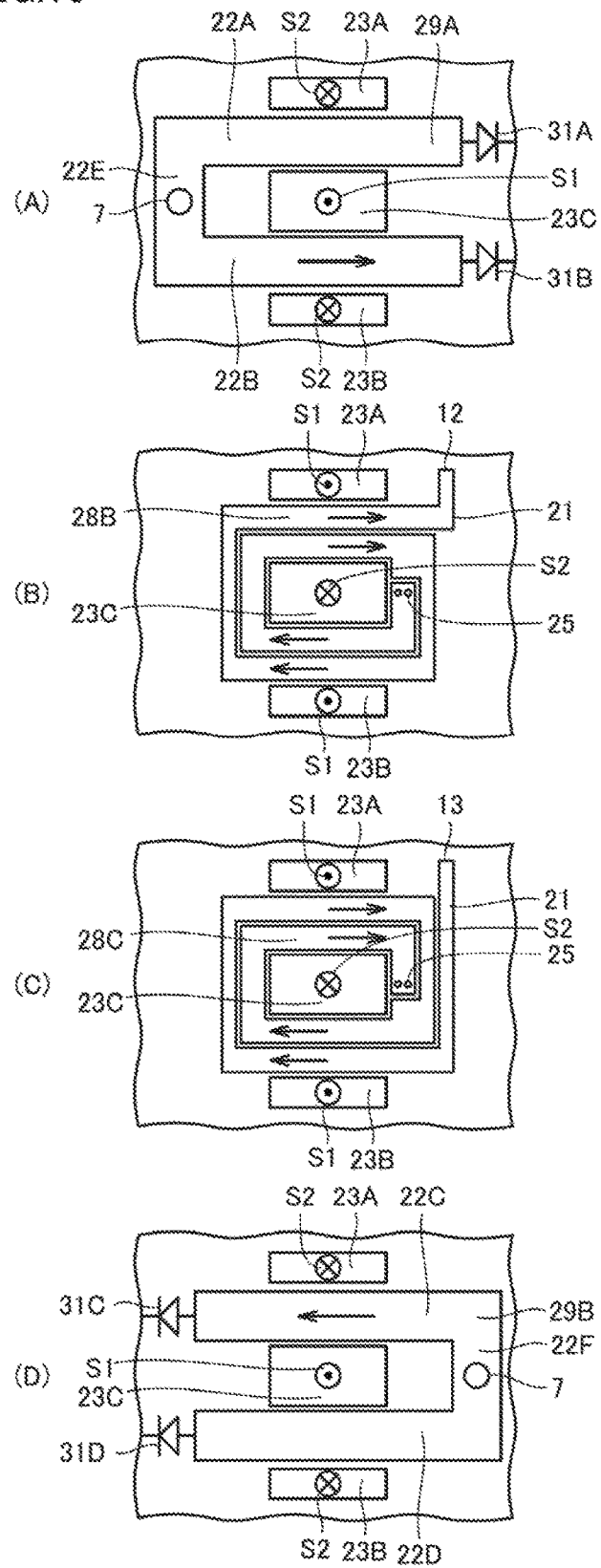
FIG. 16 shows a schematic plan view (A) showing a mode of coils and the second state of the coils in the first layer of the metallic thin film pattern in the multilayer printed board of FIG. 3 in the first example of the second embodiment, a schematic plan view (B) showing a mode of coils and the second state of the coils in the second layer of the metallic thin film intern in the multilayer printed board of FIG. 3 in the first example of the second embodiment, a schematic plan view (C) showing a mode of coils and the second state of the coils in the third layer of the metallic thin film pattern in the multilayer printed board of FIG. 3 in the first example of the second embodiment, and a schematic plan view (D) showing a mode of coils and the second state of the coils in the fourth layer of the metallic thin film pattern in the multilayer printed board of FIG. 3 in the first example of the second embodiment.

That is, as shown in FIG. 15 (B) and FIG. 15 (C), magnetic fluxes S1 and S2 occur in outer legs 23A, 23B and middle leg 23C in the first state (similar to that of the first embodiment) similarly to FIG. 4 (B) and FIG. 4 (C), and electric current flows in primary-side coil 21. At this time, electric current is going to flow in secondary-side coil 22 so as to cancel out magnetic fluxes S1 and S2 in FIG. 4 (B) and FIG. 4 (C) (such that magnetic fluxes S2, S1 in the opposite directions occur). Accordingly, and by the rectifying function of rectifier elements 31A to 31D, electric currents opposite to each other flow in secondary-side coils 22A and 22D in the first state as shown in the drawing. Referring to FIG. 16 (A) to (D), since magnetic fluxes occur in core 23 similarly to FIG. 5 (A) to (D) in the second state (similar to that of the first embodiment), electric currents opposite to each other flow in secondary-side coils 22B and 22C as shown in the drawing from the viewpoint of canceling them out and by the rectifying function of rectifier elements 31A to 31D.

In this way, in the present embodiment, electric currents flowing simultaneously in secondary-side coil 22 can flow in secondary-side coils 22A and 22D which are not located on the same layer (located on different layers, i.e., different planes) and can flow in secondary-side coil 22B and secondary-side coil 22C which are not located on the same layer (located on different layers, i.e., different planes). In this regard, the present embodiment differs from the first embodiment in which electric currents flow simultaneously in secondary-side coils 22A and 22D located on the same layer (on the same plane) and flow in secondary-side coils 22B and 22C located on the same layer (on the same plane).

This is based on the following reasons. In the present embodiment, secondary-side coils 22A and 22B as the same layer are connected together by connecting portion 22E to become integral with each other. Similarly, secondary-side coils 22C and 22D as the same layer are connected together by connecting portion 22F to become integral with each other.

The directions of rectification from connecting portion 22E to secondary-side coils 22A and 22B as the same layer can thereby be made identical (rightward in FIG. 15 (A)). Similarly, the directions of rectification from connecting portion 22F to secondary-side coils 22A and 22B as the same layer can be made identical (leftward in FIG. 15 (A)). According to this and the effect that electric current flows in the direction opposite to primary-side coil 21 because of the magnetic coupling as described in the first embodiment, electric currents flow simultaneously in two secondary-side coils which are not located on the same layer.

In this way, a plurality of (two) electric currents flowing simultaneously in parallel to each other in secondary-side coils 22A to 22D only need to be opposite to each other, and do not need to flow in coils arranged on the same layer. It is sufficient that a plurality of electric currents in secondary-side coils flow in opposite directions to each other, and they have a function of producing a turn of electric currents in a pseudo manner for stepping down as a transformer.

In the present embodiment, the first and third secondary-side coils are arranged on the same layer (on the same plane), and the second and fourth secondary-side coils are arranged on the same layer (on the same plane). However, this is not a limitation, but the first and fourth secondary-side colts may be arranged on the same layer, for example. In this case, secondary-side coil 22A serves as the first secondary-side coil, and secondary-side coil 22B serves as the fourth secondary-side coil, for example.

Since the remaining configuration of the present embodiment is almost the same as that of the first embodiment, the same, reference characters are allotted to the same elements, and description thereof will not be repeated.

Next, the operation effects of the present embodiment will be described. In addition to the operation effects of the first embodiment, the present embodiment can produce the following operation effects.

Since secondary-side coil 22 is formed of metal plates 29A and 29B in the present embodiment, the thickness becomes larger than in the case in which secondary-side coil 22 is formed as a thin film pattern. It is therefore possible to increased the current-carrying cross section of secondary-side coil 22 of the present embodiment. Accordingly, even if the output current of the insulation type step-down converter increases to increase electric currents in secondary-side coil 22, the amount of heat generated by secondary-side coil 22 can be reduced in the present embodiment.

Moreover, by integrating secondary side coils 22A and 22B by connecting portion 22E, manufacturing costs can be made lower than in the case in which they are separate members. The same also applies to secondary-side coils 22C and 22D integrated by connecting portion 22F.

Regarding the present embodiment which enables reduction of heat generation as described above, the radiation path of the above-described step-down transformer will be described finally using FIG. 17.

Figure 17:
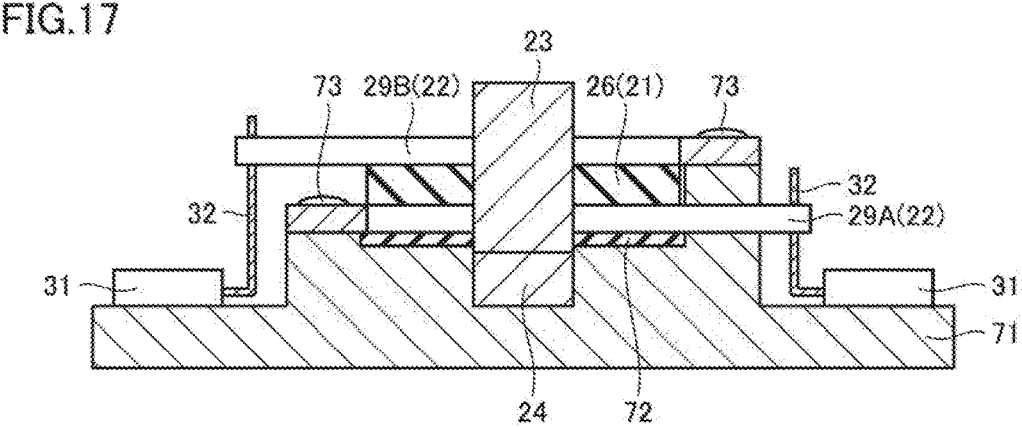
FIG. 17 is a schematic sectional view showing a mode in which a portion along the line XVII-XVII of FIG. 13 in the second embodiment has been assembled and set in a radiator.

Referring to FIG. 17, the step-down transformer after assembly at a portion along the line XVII-XVII of FIG. 13 is basically similar to the configuration of the first embodiment in FIG. 12, but differs in the following points.

Metal plates 29A and 29B as secondary-side coil 22 are formed in multilayer printed board 26 including primary-side coil 21 in the above-described mode. One end of a pair of ends of each of metal plates 29A and 29B as secondary-side coil 22 (particularly, a through-hole leading to reference potential 7 shown in FIGS. 15 (A) and (D)) is preferably fixed to radiator 71 as reference potential 7 on the secondary side with screws 73 (see FIG. 15 (A)). With these screws 73, metal plates 29A and 29B (multilayer printed board 26 including them) can be stably fixed to radiator 71, and heat generated by secondary-side coil 22 can be easily transferred to radiator 71 through screws 73. Heat generated by secondary-side coil 22 can also be transferred to radiator 71 through the contact surface between metal plate 29A (see FIG. 14) which is the lowermost layer of multilayer printed board 26 and radiator 71. Secondary-side coil 22 and radiator 71 can also be electrically connected to each other with these screws 73 interposed therebetween, and secondary-side coil 22 and radiator 71 can also be electrically connected to each other with the contact surface between metal plate 24A (see FIG. 14) which is the lowermost layer of multilayer printed board 26 and radiator 71 interposed therebetween.

Part of the surface of metal plate 29A leads to radiator 71 with insulating sheet 72 interposed therebetween. Heat generated by secondary-side coil 22 (metal plate 29A) can also be easily transferred to radiator 71 along this path.

Summarizing the foregoing, a total of three heat transfer paths from secondary-side coil 22 (metal plate 29A) of multilayer printed board 26 to radiator 71 exist (partly not shown). Specifically, the three paths include a path along which heat is directly transferred from secondary-side coil 22 to radiator 71, a path along which heat is transferred from secondary-side coil 22 to radiator 71 through screws 73 fixing secondary-side coil 22 (with screws 73 interposed therebetween), and a path along which heat is transferred from secondary-side coil 22 to radiator 71 through insulating sheet 72. Among them, the above-described first and second paths can also serve as paths of electric currents from secondary side coil 22 to radiator 71.

It is noted that the heat transfer paths from primary-side coil 21 to radiator 71 are basically similar to those in FIG. 12 of the first embodiment, and description thereof will not be repeated here. Since the remaining configuration in FIG. 17 is similar to the radiation paths of the first embodiment in FIG. 12, description thereof will not be repeated here.

Third Embodiment

A third embodiment differs from the first embodiment particularly in the configuration of a smoothing coil. A circuit constituting an insulation type step-down converter of the present embodiment will be described first using FIG. 18.

Figure 18:
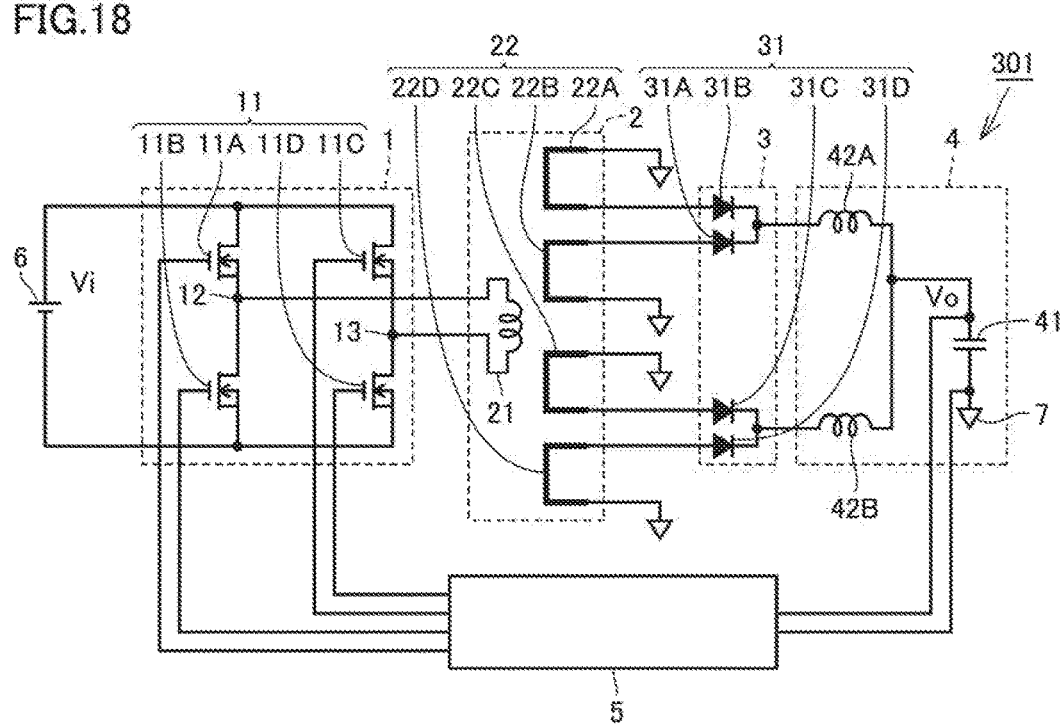
FIG. 18 is a circuit block diagram showing a first example of an insulation type step-down converter of a third embodiment.

Referring to FIG. 18, an insulation type step-down converter 301 of the present embodiment basically has a similar configuration to that of insulation type step-down converter 101 of the first embodiment (FIG. 1). However, insulation type step-down converter 301 differs from insulation type step-down converter 101 in that smoothing coil 42 constituting smoothing circuit 4 is divided into two smoothing coil 42A (first smoothing element) and smoothing coil 42B (second smoothing element).

Smoothing coil 42A is connected to secondary-side coil 22A (either the first or second secondary-side coil) and secondary-side coil 22B (either the third or fourth secondary-side coil), and can flow electric current flowing in any of these coils and passed through rectifier circuit 3. Smoothing coil 42B is directly connected to secondary-side coil 22C (the other one of the first and second secondary-side coils) and secondary-side coil 22D (the other one of the third and fourth secondary-side coils), and can flow electric current flowing in any of these coils and passed through rectifier circuit 3.

As a specific example, in the above-described first embodiment, secondary-side coil 22A is the first secondary-side coil, secondary-side coil 22C is the second secondary-side coil, secondary-side coil 22D is the third secondary-side coil, and secondary-side coil 22B is the fourth secondary-side coil. In the above-described second embodiment, secondary-side coil 22A is the first secondary-side coil, secondary-side coil 22C is the second secondary-side coil, secondary-side coil 22B is the third secondary-side coil, and secondary-side coil 22D is the fourth secondary-side coil.

Smoothing coil 42A is connected to the cathodes of rectifier elements 31A and 31B, and electric currents flowing in secondary-side coils 22A and 22B flow therein. Smoothing coil 42B is, connected to the cathodes, of rectifier elements 31C and 31D, and electric currents flowing in secondary-side coils 22C and 22D flow therein.

It is noted that since the remaining configuration of the present embodiment is almost the same as that of the first embodiment, the same reference characters are allotted to the same elements, and description thereof will not be repeated.

Next, the operation effects of the present embodiment will be described.

Provided that the output current of the insulation type step-down converter increases and the amount of electric current flowing in smoothing coil 42 increases, it is necessary to enlarge smoothing coil 42, which may thereby cause degraded productivity and degraded vibration resistance of the insulation step-down converter.

Therefore, in the present embodiment, smoothing coil 42 is divided into two smoothing coils 42A and 42B. Since the amount of electric currents flowing in the smoothing coils from respective secondary-side coils 22A to 22D can thereby be distributed as compared with the case in which there is one smoothing coil 42, heat generated by smoothing coils 42A and 42B can be distributed, which facilitates heat dissipation from smoothing coils 42A and 42B. Therefore, smoothing coils 42A and 42B can be made more compact.

However, precision design may be difficult simply by dividing smoothing coil 42 into two smoothing coils 42A and 42B. Further operation effects of the present his embodiment will be described next, while describing changes in electric current flowing in each of smoothing coils 42A and 42B.

Referring to FIG. 19 (A), the horizontal axis of each graph indicates the elapsed time, and the vertical axis indicates an electric current $I_A$ (upper graph) flowing in smoothing coil 42A or an electric current $I_B$ (lower graph) flowing in smoothing coil 42B. It is noted that elapsed times 1 to 9 along the horizontal axis each indicate, as a relative value of a dimensionless number, the time at which the value of electric current $I_A$ or $I_B$ indicates the local maximum or the local minimum.

FIG. 19 (A) shows a state in which the values of electric current $I_A$ and electric current $I_B$ become equal at each time point, i.e., a coupling balanced, state. At this time, electric current $I_A$ flowing in secondary-side coil 22A and electric current $I_B$ flowing in secondary-side coil 22D at the same time point are equal in value, and electric current $I_A$ flowing in secondary-side coil 22B and electric current $I_B$ flowing in secondary-side coil 22C at the same time point are equal in value. On the other hand, FIG. 19 (B) shows a state in which the electric current $I_A$ and electric current $I_B$ do not become equal in value at each time point, disorderly causing a large and small relation between them, i.e., a coupling unbalanced state.

The coupling unbalanced state as shown in FIG. 19 (B) may be caused by the difference in strength of coupling between each of two outer legs 23A, 23B and middle leg 23C of E-shaped cores 23 in step-down transformer 2. Specifically, since the coupling on the side of outer leg 23A of E-shaped core 23 is stronger than the coupling on the side of outer leg 23B, for example, the voltage and electric current in first and second secondary-side coils 22A and 22C between outer leg 23A and middle leg 23C may become larger than the voltage and electric current in third and fourth secondary-side coils 22B and 22D between outer leg 23B and middle leg 23C. In this case, if first and second secondary-side coils 22A and 22C are connected to smoothing coil 42A and third and fourth secondary-side coils 22B and 22D are connected to smoothing coil 42B, for example, the electric current flowing in smoothing coil 42A becomes larger in value than the electric current flowing in smoothing coil 42B, causing unbalance between the values of electric currents flowing in smoothing coil 42A and smoothing coil 42B.

Therefore, in the present embodiment, one of first and second secondary-side coils 22A and 22C located between outer leg 23A and middle leg 23C (e.g., secondary-side coil 22A) and one of third and fourth secondary-side coils 22B and 22D located between outer leg 23B and middle leg 23C (e.g., secondary-side coil 22B) are connected to smoothing coil 42A. In the present embodiment, the other one of first and second secondary-side coils 22A and 22C located between outer leg 23A and middle leg 23C (e.g., secondary-side coil 22C) and the other one of third and fourth secondary-side coils 22B and 22D located between outer leg 23B and middle leg 23C (e.g., secondary-side coil 22D) are connected to smoothing coil 42B.

Assume that the difference in strength of coupling of E-shaped core 23 described above, for example, causes unbalance in which the voltage and electric current in secondary-side coils 22A and 22C becomes larger than the voltage and electric current in secondary-side coils 22B and 22D. At this time, a relatively large electric current in secondary-side coil 22A and a relatively small electric current in secondary-side coil 22B flow in smoothing coil 42A. Moreover, at this time, a relatively large electric, current in secondary-side coil 22C and a relatively small electric current in secondary-side coil 22D flow in smoothing coil 42B.

As shown in FIG. 19 (B), for example, a huge electric current in secondary-side coil 22A flows in smoothing coil 42A, and a small electric current in secondary-side coil 22D (smaller than in secondary-side coil 22A) flows in smoothing coil 42B from time t=1 to t=3 (from t=5 to t=7). From time t=3 to t=5 (from t=7 to t=9), a small current of secondary-side coil 22B flows in smoothing coil 42A, and a large current of secondary-side coil 22C (larger than in secondary-side coil 22B) flows in smoothing coil 42B. At time t=1, 5, 7, and 9, equal electric currents flow in smoothing coil 42A and smoothing coil 42B (with each lapse of a time equivalent to a phase of 180°). In this way, in the coupling unbalanced state, the large and small relation between electric currents flowing in the respective secondary-side coils may be changed with time.

In the present embodiment, even if the above-described coupling unbalanced state occurs, averaging the whole time from t=1 to time t=9 can reduce (substantially equalize) the difference in sum of values of electric currents between smoothing coil 42A and smoothing coil 42B. Therefore so-called limit design can be performed without the need to design a margin in consideration of unbalance in electric currents for smoothing coils 42A and 42B.

It is noted that the structural characteristics described in the respective embodiments (respective examples) described above can be combined appropriately within the range where technical inconsistency does not occur.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 1 primary-side drive circuit; 2 step-down transformer; 3 rectifier circuit; 4 smoothing circuit; 5 control circuit; 6 DC power supply; 7 reference potential; 11, 11A, 11B, 11C, 11D switching element; 12, 13 node; 21 primary-side coil; 22, 22A, 22B, 22C, 22D secondary-side coil; 22E, 22F connecting portion; 23 E-shaped core; 23A, 23B outer leg; 23C middle leg; 23D core coupling part; 24 I-shaped core; 25 connection via; 26 multilayer printed board; 26A, 26B, 26C through-hole; 27 substrate body; 28, 28A, 28B, 28C, 28D pattern; 29A, 29B metal plate; 31, 31A, 31B, 31C, 31D rectifier element; 41 smoothing capacitor; 42 smoothing coil; 71 radiator; 72 insulating sheet; 73 screw; 74 housing; 101, 102, 301 insulation type step-down converter; S1, S2 magnetic flux.

The invention claimed is:
1. An insulation type step-down converter comprising:
a core including a middle leg, a first outer leg spaced from the middle leg and arranged to extend in a direction identical to the middle leg, and a second outer leg spaced from the middle leg opposite to the first outer leg;
a primary-side coil wound around the middle leg;
first and second secondary-side coils arranged between the first outer leg and the middle leg, overlapping at least part of the primary-side coil, the first and second secondary-side coils being spaced from each other;
third and fourth secondary-side coils arranged between the second outer leg and the middle leg, overlapping at least part of the primary-side coil, the third and fourth secondary-side coils being spaced from each other; and
first, second, third, and fourth rectifier elements connected to the first, second, third, and fourth secondary-side coils, respectively,
the first, second, third, and fourth rectifier elements being configured to perform rectification such that electric currents flow alternately only in one of the first and second secondary-side coils and one of the third and fourth secondary-side coils, and electric currents flowing simultaneously in one of the first and second secondary-side coils and one of the third and fourth secondary-side coils are opposite in direction to each other so as to cancel out a magnetic flux passing through the middle leg each time when electric current flowing in the primary-side coil is changed in direction.
2. The insulation type step-down converter according to claim 1, wherein
one of the first and second secondary-side coils and one of the third and fourth secondary-side coils, in which electric currents flow simultaneously, are arranged on different layers, and
the other one of the first and second secondary-side coils and the other one of the third and fourth secondary-side coils, in which electric currents flow simultaneously, are arranged on different layers.
3. The insulation type step-down converter according to claim 1, wherein
the first, second, third, and fourth secondary-side coils are formed of a metal plate, the first and third secondary-side coils are arranged on an identical layer, and the second and fourth secondary-side coils are arranged on an identical layer, and the first and third secondary-side coils are connected by a connecting portion formed of the metal plate, and the second and fourth secondary-side coils are connected to each other by a connecting portion formed of the metal plate.

4. The insulation type step-down converter according to claim 1, wherein one of the first and second secondary-side coils and one of the third and fourth secondary-side coils, in which electric currents flow simultaneously, are arranged on a first layer identical to each other, and the other one of the first and second secondary-side coils and the other one of the third and fourth secondary-side coils, in which electric currents flow simultaneously, are arranged on a second layer identical to each other, the second layer being different from the first layer.

5. The insulation type step-down converter according to claim 1, wherein each of the first, second, third, and fourth secondary-side coils extend linearly.

6. The insulation type step-down converter according to claim 1, further comprising:

a primary-side drive circuit configured to alternately apply voltages of opposite polarity to the primary-side coil at regular time intervals; and a smoothing circuit configured to smooth voltages output from the first, second, third, and fourth secondary-side coils.

7. The insulation type step-down converter according to claim 6, wherein the smoothing circuit includes a first smoothing element configured to flow electric current flowing in one of the first and second secondary-side coils and electric current flowing in one of the third and fourth secondary-side coils, and a second smoothing circuit configured to flow electric current flowing in the other one different from the one of the first and second secondary-side coils and electric current flowing in the other one different from the one of the third and fourth secondary-side coils.

8. The insulation type step-down converter according to claim 1, wherein one ends of a pair of ends of each of the first, second, third, and fourth secondary-side coils are connected to the first, second, third, and fourth rectifier elements, respectively, and the other end opposite to the one end of the pair of ends of each of the first, second, third, and fourth secondary-side coils leads to one of a radiator as a reference potential and a housing.

* * * * *